United States Patent
Ding

(10) Patent No.: US 10,244,388 B2
(45) Date of Patent: Mar. 26, 2019

(54) LOCATION PRIVACY PROTECTION METHOD, APPARATUS, AND SYSTEM

(71) Applicant: Huawei Device (Dongguan) Co., Ltd., Dongguan (CN)

(72) Inventor: Zhiming Ding, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 288 days.

(21) Appl. No.: 15/198,918

(22) Filed: Jun. 30, 2016

(65) Prior Publication Data

US 2016/0316362 A1    Oct. 27, 2016

Related U.S. Application Data

(63) Continuation of application No. PCT/CN2014/095675, filed on Dec. 30, 2014.

(30) Foreign Application Priority Data

Dec. 30, 2013   (CN) .......................... 2013 1 0747092

(51) Int. Cl.
*H04L 21/00* (2006.01)
*H04W 12/02* (2009.01)
(Continued)

(52) U.S. Cl.
CPC ............. *H04W 12/02* (2013.01); *H04L 41/12* (2013.01); *H04L 63/06* (2013.01); *H04W 4/02* (2013.01);
(Continued)

(58) Field of Classification Search
CPC ..... H04L 63/06; H04L 41/12; H04L 63/0407; H04L 63/0428; H04W 64/006; H04W 12/06; H04W 8/26; H04W 88/08
See application file for complete search history.

(56) References Cited

U.S. PATENT DOCUMENTS 7,809,123 B2   10/2010  Karnalkar et al.
8,069,483 B1 * 11/2011  Matlock ................ H04W 12/12
                                                    713/154
(Continued)

FOREIGN PATENT DOCUMENTS

CN        1852261 A     10/2006
CN      101305626 A     11/2008
(Continued)

OTHER PUBLICATIONS

Heng, L., et al., "Overview of location privacy in pervasive computing," Journal of Electronic Measurement and Instrument, vol. 24, No. 7, 2010, 9 pages.
(Continued)

*Primary Examiner* — Morshed Mehedi
(74) *Attorney, Agent, or Firm* — Conley Rose, P.C.

(57) ABSTRACT

A location privacy protection method includes generating an identifier update notification message to be sent to at least one access point, where the identifier update notification message includes a first identifier of a wireless terminal, to indicate that the identifier update notification message is to be sent by the wireless terminal. The identifier update notification message further includes second identifier information of the wireless terminal. The method further includes sending the identifier update notification message, so that the access point acquires a second identifier according to the second identifier information, and uses the second identifier as an identifier of the wireless terminal; and sending a subsequent message including the second identifier to the access point, to indicate that the subsequent message is sent by the wireless terminal.

20 Claims, 10 Drawing Sheets

(51) Int. Cl.

| | |
|---|---|
| *H04W 8/26* | (2009.01) |
| *H04W 64/00* | (2009.01) |
| *H04L 12/24* | (2006.01) |
| *H04L 29/06* | (2006.01) |
| *H04W 4/02* | (2018.01) |
| *H04W 12/06* | (2009.01) |
| *H04W 84/12* | (2009.01) |
| *H04W 88/08* | (2009.01) |

(52) U.S. Cl.
CPC ............ *H04W 8/26* (2013.01); *H04W 12/06* (2013.01); *H04W 64/00* (2013.01); *H04W 64/006* (2013.01); *H04L 63/0407* (2013.01); *H04L 63/0428* (2013.01); *H04W 84/12* (2013.01); *H04W 88/08* (2013.01)

(56) References Cited

U.S. PATENT DOCUMENTS

| | | |
|---|---|---|
| 8,261,090 B1 | 9/2012 | Matsuoka |
| 2003/0177267 A1* | 9/2003 | Orava ............... H04L 29/12254 709/245 |
| 2007/0189281 A1* | 8/2007 | Ishizaka ........... H04L 29/06027 370/356 |
| 2009/0124248 A1 | 5/2009 | Ohnishi et al. |
| 2010/0118833 A1 | 5/2010 | Hahn et al. |
| 2010/0299725 A1* | 11/2010 | Yamada ................ H04L 1/1607 726/4 |
| 2013/0114615 A1 | 5/2013 | Suemitsu et al. |
| 2013/0281110 A1* | 10/2013 | Zelinka ................ G01S 5/0284 455/456.1 |
| 2015/0006581 A1 | 1/2015 | Luo |

FOREIGN PATENT DOCUMENTS

| | | |
|---|---|---|
| CN | 101631116 A | 1/2010 |
| CN | 102014114 A | 4/2011 |
| CN | 102595319 A | 7/2012 |
| CN | 103391536 A | 11/2013 |
| CN | 103620616 A | 3/2014 |
| EP | 1657616 A1 | 5/2006 |
| WO | 2011132568 A1 | 10/2011 |
| WO | 2013042598 A1 | 3/2013 |

OTHER PUBLICATIONS

Edney, J., et al., "Temporary MAC Addresses for ANonymity," IEEE 802.11-02/109r1, Jul. 2002, 16 pages.
"TGu Proposal for Protection Cluster," IEEE 802.11-06/0287r0, Mar. 2006, 8 pages.
Orava, P., et al., "Tempirary MAC Addresses for Anonymity," IEEE 802.11-11-02-261r2, Jun. 2002, 17 pages.
Foreign Communication From a Counterpart Application, European Application No. 14877466.4, Extended European Search Report dated Oct. 11, 2016, 14 pages.
Foreign Communication From a Counterpart Application, PCT Application No. PCT/CN2014/095675, English Translation of International Search Report dated Apr. 3, 2015, 3 pages.
Foreign Communication From a Counterpart Application, PCT Application No. PCT/CN2014/095675, English Translation of Written Opinion dated Apr. 3, 2015, 5 pages.
"OpenFlow Switch Specification," Version 1.3.4 (Protocol version 0x04), Open Networking Foundation, Mar. 27, 2014, 171 pages.
Foreign Communication From a Counterpart Application, European Application No. 14889738.2, Extended European Search Report dated Mar. 20, 2017, 6 pages.
Foreign Communication From a Counterpart Application, PCT Application No. PCT/CN2014/075481, English Translation of International Search Report dated Jan. 28, 2015, 2 pages.
Foreign Communication From a Counterpart Application, PCT Application No. PCT/CN2014/075481, English Translation of Written Opinion dated Jan. 28, 2015, 6 pages.
Foreign Communication From a Counterpart Application, Chinese Application No. 201310747092.5, Chinese Office Action dated Sep. 28, 2017, 13 pages.

\* cited by examiner

LOCATION PRIVACY PROTECTION METHOD, APPARATUS, AND SYSTEM

CROSS-REFERENCE TO RELATED APPLICATIONS

This application is a continuation of International Application No. PCT/CN2014/095675, filed on Dec. 30, 2014, which claims priority to Chinese Patent Application No. 201310747092.5, filed on Dec. 30, 2013, both of which are hereby incorporated by reference in their entireties.

TECHNICAL FIELD

The present disclosure relates to the field of terminal privacy protection, and in particular, to a location privacy protection method, apparatus, and system.

BACKGROUND

As a Wi-Fi technology is widely applied, intelligent terminals that gradually become popular all support the Wi-Fi technology. In this case, a Wi-Fi-based indoor positioning application is gradually becoming a possibility. A working process of positioning may be as follows.

First, an access point (AP) sends a positioning configuration request frame to a terminal, where the positioning configuration request frame includes information such as a channel, a multicast address, and a period. The channel refers to a channel that is used by the terminal to send a location track notification frame. The multicast address is a group address of a group of APs that receive the location track notification frame, and the group of APs may be one or more APs. The period is a period for the terminal to send the location track notification frame.

Second, the terminal sends a positioning configuration response frame to the AP, where the positioning configuration response frame indicates acceptation or refusing of a positioning configuration request. When accepting the positioning configuration request, the terminal sends the location track notification frame to the AP. Finally, the AP calculates a location of the terminal according to the location track notification frame.

A frame header of the location track notification frame sent by the foregoing terminal includes a Media Access Control (MAC) address of the terminal and a MAC address of the AP, and the MAC address of the terminal is an identifier of the terminal. If the terminal always uses a fixed MAC address, that is, uses a fixed identifier, in the location track notification frame, it results in that a moving track of the terminal is traced. Because there is a one-to-one correspondence between the address of the terminal and a user that holds the terminal, the moving track of the terminal may be regarded as a moving track of the user. When the moving track of the terminal is traced, in practical terms, the moving track of the user is traced. As a result, location privacy of the user that holds the terminal is not protected.

In addition, an effective propagation distance of a Wi-Fi message is usually about 100 meters. If a Wi-Fi message of a terminal is intercepted, it means that a user that holds the terminal is near a listener. Therefore, even though the terminal does not perform the foregoing positioning process, once the terminal sends a Wi-Fi message, a fixed address, used by the terminal, included in the message discloses location privacy of the user.

SUMMARY

A technical problem to be resolved in the present disclosure is to provide a location privacy protection method, apparatus, and system, so as to resolve a problem in the prior art that location privacy of a user that holds a terminal is not protected. Technical solutions are as follows.

According to a first aspect, an embodiment of the present disclosure provides a location privacy protection method, applied to a wireless terminal, where the location privacy protection method includes generating an identifier update notification message to be sent to at least one access point, where the identifier update notification message includes a first identifier of the wireless terminal, to indicate that the identifier update notification message is to be sent by the wireless terminal, and the identifier update notification message further includes second identifier information of the wireless terminal; sending the identifier update notification message, so that the access point acquires a second identifier according to the second identifier information, and uses the second identifier as an identifier of the wireless terminal; and sending a subsequent message to the access point, where the subsequent message includes the second identifier, to indicate that the subsequent message is sent by the wireless terminal.

In a first possible implementation manner of the first aspect, the sending the identifier update notification message includes sending the identifier update notification message after receiving an identifier update request message sent by the access point; or sending the identifier update notification message after a set identifier update time arrives, where the set identifier update time is included in an identifier update request message sent by the access point; or sending the identifier update notification message after an identifier update time determined by the wireless terminal arrives.

With reference to the first aspect or the first possible implementation manner of the first aspect, in a second possible implementation manner of the first aspect, the second identifier information includes the second identifier that is encrypted; or the second identifier information includes the second identifier that is encrypted and first identifier validity period information that is encrypted; or the second identifier information includes the second identifier that is encrypted and the first identifier validity period information that is not encrypted; or the second identifier information includes the second identifier that is encrypted and second identifier update time information that is encrypted; or the second identifier information includes the second identifier that is encrypted and the second identifier update time information that is not encrypted.

With reference to the second possible implementation manner of the first aspect, in a third possible implementation manner of the first aspect, the method further includes receiving an identifier update key from the access point, where the identifier update key is used to encrypt at least the second identifier.

With reference to the first aspect or the first possible implementation manner of the first aspect, in a fourth possible implementation manner of the first aspect, the identifier update notification message is a location track notification frame, and the subsequent message is a subsequent location track notification frame.

According to a second aspect, an embodiment of the present disclosure provides a location privacy protection method, applied to an access point, where the location privacy protection method includes receiving an identifier update notification message sent by a wireless terminal, where the identifier update notification message includes a first identifier of the wireless terminal, to indicate that the identifier update notification message is sent by the wireless terminal, and the identifier update notification message further includes second identifier information of the wireless terminal; acquiring a second identifier from the second identifier information, and using the second identifier as an identifier of the wireless terminal; and if a value of an identifier field, in a received subsequent message, that indicates a device that sends the subsequent message is the second identifier, determining that the subsequent message is sent by the wireless terminal.

In a first possible implementation manner of the second aspect, before the receiving an identifier update notification message sent by a wireless terminal, the method further includes sending an identifier update request message to the wireless terminal, where the identifier update request message is used to request the wireless terminal to send the identifier update notification message, so as to update the identifier of the wireless terminal.

With reference to the second aspect or the first possible implementation manner of the second aspect, in a second possible implementation manner of the second aspect, the second identifier information includes the second identifier that is encrypted; or the second identifier information includes the second identifier that is encrypted and first identifier validity period information that is encrypted; or the second identifier information includes the second identifier that is encrypted and the first identifier validity period information that is not encrypted; or the second identifier information includes the second identifier that is encrypted and second identifier update time information that is encrypted; or the second identifier information includes the second identifier that is encrypted and the second identifier update time information that is not encrypted.

With reference to the second possible implementation manner of the second aspect, in a third possible implementation manner of the second aspect, the method further includes sending an identifier update key, where the identifier update key is used to encrypt at least the second identifier.

With reference to the second aspect or the first possible implementation manner of the second aspect, in a fourth possible implementation manner of the second aspect, the identifier update notification message is a location track notification frame, and the subsequent message is a subsequent location track notification frame.

According to a third aspect, an embodiment of the present disclosure further provides a location privacy protection method, applied to an access point, where the location privacy protection method includes generating an identifier update notification message to be sent to a wireless terminal, where the identifier update notification message includes a first identifier of the wireless terminal, to indicate that the identifier update notification message is to be sent to the wireless terminal, and the identifier update notification message further includes second identifier information of the wireless terminal; sending the identifier update notification message, so that the wireless terminal acquires a second identifier according to the second identifier information, and adds the second identifier to a message subsequently sent by the wireless terminal, to indicate that the subsequently sent message is sent by the wireless terminal.

In a first possible implementation manner of the third aspect, at the same time of the sending the identifier update notification message, the method further includes generating another identifier update notification message to be sent to another wireless terminal, and sending the another identifier update notification message to the another wireless terminal, so that a message subsequently sent by the another wireless terminal includes a respective second identifier, to indicate a sending terminal that sends the message.

In a second possible implementation manner of the third aspect, before the sending the identifier update notification message, the method further includes detecting a moving track intersection event between the wireless terminal and another wireless terminal; and if it is detected that a moving track intersection event occurs between the wireless terminal and the another wireless terminal, sending the identifier update notification message.

In a third possible implementation manner of the third aspect, the identifier update notification message further includes second identifier update time information, so that the wireless terminal adds the second identifier to the subsequently sent message after the second identifier update time arrives, to indicate that the subsequently sent message is sent by the wireless terminal; or the identifier update notification message further includes first identifier validity period information, so that the wireless terminal adds the second identifier to the subsequently sent message after the first identifier validity period expires, to indicate that the subsequently sent message is sent by the wireless terminal.

With reference to the third aspect or any possible implementation manner of the first possible implementation manner to the third possible implementation manner of the third aspect, in a fourth possible implementation manner of the third aspect, the second identifier in the identifier update notification message is encrypted using a key, where the key is a key of a point-to-point session between the access point and the wireless terminal.

With reference to the third aspect or any possible implementation manner of the first possible implementation manner to the third possible implementation manner of the third aspect, in a fifth possible implementation manner of the third aspect, the identifier update notification message is a positioning configuration request frame.

According to a fourth aspect, an embodiment of the present disclosure further provides a location privacy protection method, applied to a wireless terminal, where the location privacy protection method includes receiving an identifier update notification message sent by an access point, where the identifier update notification message includes a first identifier of the wireless terminal, to indicate that the identifier update notification message is sent to the wireless terminal, and the identifier update notification message further includes second identifier information of the wireless terminal; acquiring a second identifier from the second identifier information, and using the second identifier as an identifier of the wireless terminal; and adding the second identifier to a message subsequently sent by the wireless terminal, to indicate that the subsequently sent message is sent by the wireless terminal.

In a first possible implementation manner of the fourth aspect, if the access point detects that a moving track intersection event occurs between the wireless terminal and another wireless terminal, the access point sends the identifier update notification message.

In a second possible implementation manner of the fourth aspect, the identifier update notification message further includes second identifier update time information, so that the wireless terminal adds the second identifier to the subsequently sent message after the second identifier update time arrives, to indicate that the subsequently sent message is sent by the wireless terminal; or the identifier update notification message includes first identifier validity period information, so that the wireless terminal adds the second identifier to the subsequently sent message after the first identifier validity period expires, to indicate that the subsequently sent message is sent by the wireless terminal.

With reference to the fourth aspect or either possible implementation manner of the first possible implementation manner and the second possible implementation manner, in a third possible implementation manner of the fourth aspect, the second identifier in the identifier update notification message is encrypted using a key, where the key is a key of a point-to-point session between the access point and the wireless terminal.

With reference to the fourth aspect or either possible implementation manner of the first possible implementation manner and the second possible implementation manner, in a fourth possible implementation manner of the fourth aspect, the identifier update notification message is a positioning configuration request frame.

According to a fifth aspect, an embodiment of the present disclosure provides a location privacy protection apparatus, applied to a wireless terminal, where the location privacy protection apparatus includes a message generation unit configured to generate an identifier update notification message to be sent to at least one access point, where the identifier update notification message includes a first identifier of the wireless terminal, to indicate that the identifier update notification message is to be sent by the wireless terminal, and the identifier update notification message further includes second identifier information of the wireless terminal; a first sending unit configured to send the identifier update notification message, so that the access point acquires a second identifier according to the second identifier information, and uses the second identifier as an identifier of the wireless terminal; and a second sending unit configured to send a subsequent message to the access point, where the subsequent message includes the second identifier, to indicate that the subsequent message is sent by the wireless terminal.

In a first possible implementation manner of the fifth aspect, the first sending unit is configured to send the identifier update notification message after receiving an identifier update request message sent by the access point; or send the identifier update notification message after a set identifier update time arrives, where the set identifier update time is included in an identifier update request message sent by the access point; or send the identifier update notification message after an identifier update time determined by the wireless terminal arrives.

With reference to the fifth aspect or the first possible implementation manner of the fifth aspect, in a second possible implementation manner of the fifth aspect, the second identifier information includes the second identifier that is encrypted; or the second identifier information includes the second identifier that is encrypted and first identifier validity period information that is encrypted; or the second identifier information includes the second identifier that is encrypted and the first identifier validity period information that is not encrypted; or the second identifier information includes the second identifier that is encrypted and second identifier update time information that is encrypted; or the second identifier information includes the second identifier that is encrypted and the second identifier update time information that is not encrypted.

With reference to the second possible implementation manner of the fifth aspect, in a third possible implementation manner of the fifth aspect, the apparatus further includes a receiving unit configured to receive an identifier update key from the access point, where the identifier update key is used to encrypt at least the second identifier.

With reference to the fifth aspect or the first possible implementation manner of the fifth aspect, in a fourth possible implementation manner of the fifth aspect, the identifier update notification message is a location track notification frame, and the subsequent message is a subsequent location track notification frame.

According to a sixth aspect, an embodiment of the present disclosure provides a location privacy protection apparatus, applied to an access point, where the location privacy protection apparatus includes a receiving unit configured to receive an identifier update notification message sent by a wireless terminal, where the identifier update notification message includes a first identifier of the wireless terminal, to indicate that the identifier update notification message is sent by the wireless terminal, and the identifier update notification message further includes second identifier information of the wireless terminal; an acquiring unit configured to acquire a second identifier from the second identifier information, and use the second identifier as an identifier of the wireless terminal; and a determining unit configured to, when a value of an identifier field, in a received subsequent message, that indicates a device that sends the subsequent message is the second identifier, determine that the subsequent message is sent by the wireless terminal.

In a first possible implementation manner of the sixth aspect, the apparatus further includes a first sending unit configured to send an identifier update request message to the wireless terminal, where the identifier update request message is used to request the wireless terminal to send the identifier update notification message, so as to update the identifier of the wireless terminal.

With reference to the sixth aspect or the first possible implementation manner of the sixth aspect, in a second possible implementation manner of the sixth aspect, the second identifier information includes the second identifier that is encrypted; or the second identifier information includes the second identifier that is encrypted and first identifier validity period information that is encrypted; or the second identifier information includes the second identifier that is encrypted and the first identifier validity period information that is not encrypted; or the second identifier information includes the second identifier that is encrypted and second identifier update time information that is encrypted; or the second identifier information includes the second identifier that is encrypted and the second identifier update time information that is not encrypted.

With reference to the second possible implementation manner of the sixth aspect, in a third possible implementation manner of the sixth aspect, the apparatus further includes a second sending unit configured to send an identifier update key, where the identifier update key is used to encrypt at least the second identifier.

With reference to the sixth aspect or the first possible implementation manner of the sixth aspect, in a fourth possible implementation manner of the sixth aspect, the identifier update notification message is a location track notification frame, and the subsequent message is a subsequent location track notification frame.

According to a seventh aspect, an embodiment of the present disclosure further provides a location privacy protection apparatus, applied to an access point, where the location privacy protection apparatus includes a message generation unit configured to generate an identifier update notification message to be sent to a wireless terminal, where the identifier update notification message includes a first identifier of the wireless terminal, to indicate that the identifier update notification message is to be sent to the wireless terminal, and the identifier update notification message further includes second identifier information of the wireless terminal; and a sending unit configured to send the identifier update notification message, so that the wireless terminal acquires a second identifier according to the second identifier information, and adds the second identifier to a message subsequently sent by the wireless terminal, to indicate that the subsequently sent message is sent by the wireless terminal.

In a first possible implementation manner of the seventh aspect, the message generation unit is further configured to generate another identifier update notification message to be sent to another wireless terminal; and the sending unit is further configured to send the another identifier update notification message to the another wireless terminal, so that a message subsequently sent by the another wireless terminal includes a respective second identifier, to indicate a sending terminal that sends the message.

In a second possible implementation manner of the seventh aspect, the apparatus further includes a detection unit configured to detect a moving track intersection event between the wireless terminal and another wireless terminal, and if it is detected that a moving track intersection event occurs between the wireless terminal and the another wireless terminal, trigger the sending unit.

In a third possible implementation manner of the seventh aspect, the identifier update notification message further includes second identifier update time information, so that the wireless terminal adds the second identifier to the subsequently sent message after the second identifier update time arrives, to indicate that the subsequently sent message is sent by the wireless terminal; or the identifier update notification message further includes first identifier validity period information, so that the wireless terminal adds the second identifier to the subsequently sent message after the first identifier validity period expires, to indicate that the subsequently sent message is sent by the wireless terminal.

With reference to the seventh aspect or any possible implementation manner of the first possible implementation manner to the third possible implementation manner of the seventh aspect, in a fourth possible implementation manner of the seventh aspect, the second identifier in the identifier update notification message is encrypted using a key, where the key is a key of a point-to-point session between the access point and the wireless terminal.

With reference to the seventh aspect or any possible implementation manner of the first possible implementation manner to the third possible implementation manner of the seventh aspect, in a fifth possible implementation manner of the seventh aspect, the identifier update notification message is a positioning configuration request frame.

According to an eighth aspect, an embodiment of the present disclosure further provides a location privacy protection apparatus, applied to a wireless terminal, where the location privacy protection apparatus includes a receiving unit configured to receive an identifier update notification message sent by an access point, where the identifier update notification message includes a first identifier of the wireless terminal, to indicate that the identifier update notification message is sent to the wireless terminal, and the identifier update notification message further includes second identifier information of the wireless terminal; an acquiring unit configured to acquire a second identifier from the second identifier information, and use the second identifier as an identifier of the wireless terminal; and a message generation unit configured to add the second identifier to a message subsequently sent by the wireless terminal, to indicate that the subsequently sent message is sent by the wireless terminal.

In a first possible implementation manner of the eighth aspect, the receiving unit is configured to, when the access point detects that a moving track intersection event occurs between the wireless terminal and another wireless terminal, receive the identifier update notification message sent by the access point.

In a second possible implementation manner of the eighth aspect, the identifier update notification message further includes second identifier update time information, so that the wireless terminal adds the second identifier to the subsequently sent message after the second identifier update time arrives, to indicate that the subsequently sent message is sent by the wireless terminal; or the identifier update notification message further includes first identifier validity period information, so that the wireless terminal adds the second identifier to the subsequently sent message after the first identifier validity period expires, to indicate that the subsequently sent message is sent by the wireless terminal.

With reference to the eighth aspect or either possible implementation manner of the first possible implementation manner and the second possible implementation manner of the eighth aspect, in a third possible implementation manner of the eighth aspect, the second identifier in the identifier update notification message is encrypted using a key, where the key is a key of a point-to-point session between the access point and the wireless terminal.

With reference to the eighth aspect or either possible implementation manner of the first possible implementation manner and the second possible implementation manner of the eighth aspect, in a fourth possible implementation manner of the eighth aspect, the identifier update notification message is a positioning configuration request frame.

According to a ninth aspect, an embodiment of the present disclosure further provides a location privacy protection system, including a wireless terminal and an access point, where the wireless terminal applies the location privacy protection method according to the first aspect or any implementation manner of the first possible implementation manner to the fourth possible implementation manner of the first aspect, and the access point applies the location privacy protection method according to the second aspect or any implementation manner of the first possible implementation manner to the fourth possible implementation manner of the second aspect.

According to a tenth aspect, an embodiment of the present disclosure provides a location privacy protection system, including a wireless terminal and an access point, where the access point applies the location privacy protection method according to the third aspect or any implementation manner of the first possible implementation manner to the fifth possible implementation manner of the third aspect, and the wireless terminal applies the location privacy protection method according to the fourth aspect or any implementation manner of the first possible implementation manner to the fourth possible implementation manner of the fourth aspect.

Compared with the prior art, the present disclosure has the following advantages.

In the embodiments of the present disclosure, a wireless terminal sends an identifier update notification message to an access point, to instruct the access point to update an identifier of the wireless terminal to a second identifier. In this way, a value of an identifier field, in a subsequent message sent by the wireless terminal, for the wireless terminal may be updated to the second identifier. Therefore, using the foregoing technical solutions, the wireless terminal may periodically or aperiodically send an identifier update notification message that is used to update an identifier of the wireless terminal, so that a value of an identifier field, in a subsequent message, for the wireless terminal is not fixed; in this way, exposing and tracing of a location of a wireless terminal that are caused due to a fixed value of an identifier field, in a message, for the wireless terminal can be avoided, effectively protecting location privacy of a user that uses the wireless terminal.

Certainly, any product that implements the present disclosure does not necessarily achieve all of the foregoing advantages.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

A location privacy protection method provided by embodiments of the present disclosure may be applied to a wireless terminal side and an AP side, where an AP may be a base station. The following clearly describes the technical solutions in the embodiments of the present disclosure from perspective of different device sides with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
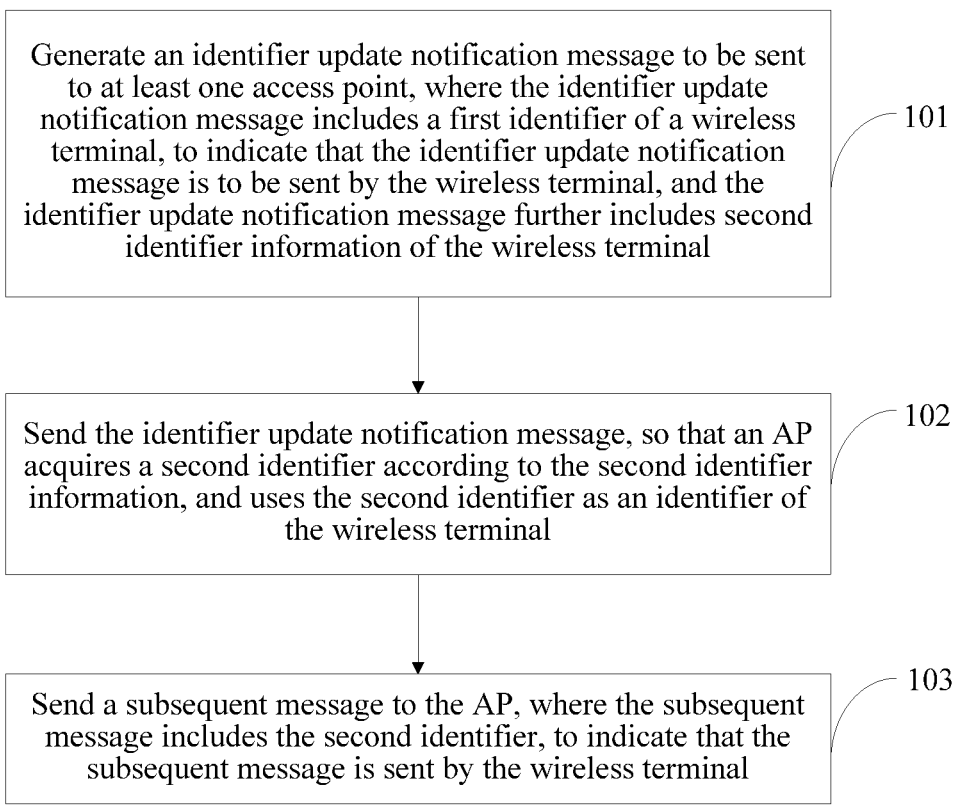
FIG. 1 is a flowchart of a location privacy protection method according to an embodiment of the present disclosure.

Refer to FIG. 1, which shows a flowchart of a location privacy protection method according to an embodiment of the present disclosure. The location privacy protection method shown in FIG. 1 is applied to a wireless terminal side, and may include the following steps.

Step 101: Generate an identifier update notification message to be sent to at least one AP.

In this embodiment of the present disclosure, the identifier update notification message is used to notify the AP that an identifier of the wireless terminal is changed. Usually, the wireless terminal is associated with an AP. Therefore, the wireless terminal may send, using a unicast message, the identifier update notification message to the AP associated with the wireless terminal. In some special application occasions, for example, in a positioning process, the wireless terminal may send an identifier update notification message to multiple APs on a network using a multicast or broadcast message.

Each identifier update notification message may include a first identifier of the wireless terminal, where the first identifier is used, in the identifier update notification message, as the identifier of the wireless terminal, and is used to indicate that the identifier update notification message is to be sent by the wireless terminal. The identifier update notification message may further include second identifier information of the wireless terminal, where the information is used to notify the AP of an updated identifier of the wireless terminal.

A first identifier in an identifier update notification message that is generated by the wireless terminal for the first time may be a fixed MAC address of the wireless terminal or an association identifier (AID) that is initially allocated by the AP to the wireless terminal; a corresponding second identifier may be a temporary MAC address or an updated AID of the wireless terminal. The temporary MAC address and the updated AID of the wireless terminal may be generated by the wireless terminal.

In a subsequently generated identifier update notification message, a first identifier is a second identifier in an identifier update notification message that is generated last time, and a second identifier in the subsequently generated identifier update notification message may be another temporary MAC address or another updated AID that is subsequently generated by the wireless terminal.

It should be noted that, the wireless terminal may periodically or aperiodically generate the identifier update notification message, so as to periodically or aperiodically update the identifier of the wireless terminal.

Step 102: Send the identifier update notification message, so that the AP acquires a second identifier according to the second identifier information, and uses the second identifier as an identifier of the wireless terminal.

Each time the wireless terminal generates an identifier update notification message, the wireless terminal may send the message to the AP. The AP updates the identifier of the wireless terminal stored by the AP; in this way, may accurately determine a sending terminal of a subsequent message after receiving the subsequent message sent by the wireless terminal.

Further, the wireless terminal may periodically or aperiodically send an identifier update notification message, where feasible manners are as follows.

First, the wireless terminal sends the identifier update notification message after receiving an identifier update request message sent by the AP; second, the wireless terminal sends the identifier update notification message after a set identifier update time in an identifier update request message sent by the AP arrives, where the set identifier update time may include validity period information of the first identifier, that is, a currently used identifier, or second identifier update time information, that is, information about a time for sending the identifier update notification message to update the identifier. Alternatively, the wireless terminal determines an identifier update time.

An identifier update notification message may be periodically or aperiodically sent using a set validity period of the first identifier, that is, a current identifier, or a set time for sending the identifier update notification message to update the identifier. Similarly, the AP may also periodically or aperiodically send an identifier update request message, to instruct the wireless terminal to send the identifier update notification message, thereby periodically or aperiodically updating the identifier of the wireless terminal.

Step 103: Send a subsequent message to the AP, where the subsequent message includes the second identifier, to indicate that the subsequent message is sent by the wireless terminal.

In the subsequent message sent by the wireless terminal, the second identifier is used as a value of an identifier field for the wireless terminal. After receiving the subsequent message, the AP first acquires the value of the identifier field for the wireless terminal from the subsequent message, and determines, by determining the value of the identifier field for the wireless terminal, that which wireless terminal sends the subsequent message.

An identifier field for the wireless terminal refers, in a message sent by the wireless terminal, to a sending address field or a source address field. Correspondingly, after receiving the identifier update notification message of the wireless terminal and updating the identifier of the wireless terminal, the AP uses the second identifier, in an identifier field, in a message subsequently sent to the wireless terminal, for the wireless terminal. The identifier field for the wireless terminal refers, in the message sent by the AP, to a receiving address field or a destination address field.

Further, the location privacy protection method provided by this embodiment of the present disclosure may be applied to an Institute of Electrical and Electronics Engineers (IEEE) 802.11 MAC layer positioning process. In the process, an identifier update notification message that is sent for the first time may be a positioning configuration response frame, a subsequently sent identifier update notification message is a location track notification frame, and a subsequent message is a subsequent location track notification frame.

It can be seen from the foregoing technical solution that, a wireless terminal may periodically or aperiodically send an identifier update notification message to an AP to update an identifier of the wireless terminal, so that a value of an identifier field, in a subsequent message, for the wireless terminal is not fixed; in this way, exposing and tracing of a location of a wireless terminal that are caused due to a fixed value of an identifier field, in a message, for the wireless terminal can be avoided, effectively protecting location privacy of a user that uses the wireless terminal.

Figure 2:
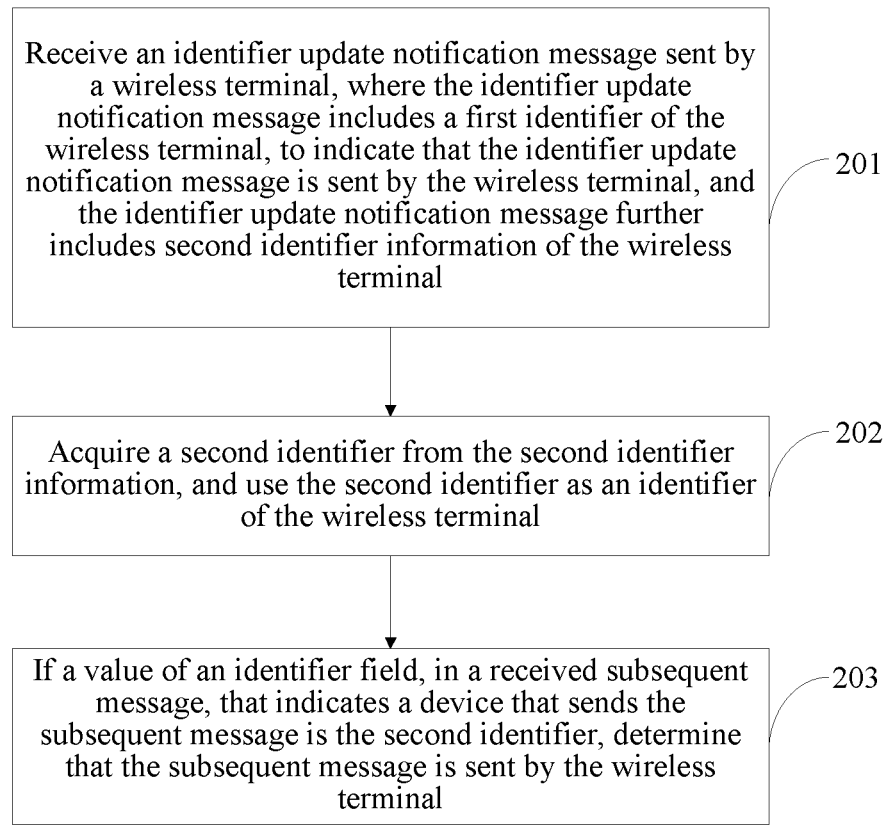
FIG. 2 is another flowchart of a location privacy protection method according to an embodiment of the present disclosure.

Corresponding to the location privacy protection method shown in FIG. 1, an embodiment of the present disclosure further provides a location privacy protection method applied to an AP. A flowchart of the method is shown in FIG. 2, and the method may include the following steps.

Step 201: Receive an identifier update notification message sent by a wireless terminal.

The identifier update notification message includes a first identifier of the wireless terminal, where the first identifier is used, in the identifier update notification message, as an identifier of the wireless terminal, and is used to indicate that the identifier update notification message is sent by the wireless terminal. The identifier update notification message may further include second identifier information of the wireless terminal, where the information is used to notify the AP of an updated identifier of the wireless terminal.

Step 202: Acquire a second identifier from second identifier information, and use the second identifier as an identifier of the wireless terminal.

In this embodiment of the present disclosure, in a first identifier update notification message received by the AP, a first identifier may be a fixed MAC address of the wireless terminal or an AID that is initially allocated by the AP to the wireless terminal; a corresponding second identifier may be a temporary MAC address or an updated AID of the wireless terminal. The temporary MAC address and the updated AID of the wireless terminal may be generated by the wireless terminal.

In a subsequently received identifier update notification message, a first identifier is a second identifier in an identifier update notification message that is received last time, and a second identifier in the subsequently received identifier update notification message may be another temporary MAC address or another updated AID that is subsequently generated by the wireless terminal.

Step 203: If a value of an identifier field, in a received subsequent message, that indicates a device that sends the subsequent message is the second identifier, determine that the subsequent message is sent by the wireless terminal.

In this embodiment of the present disclosure, the identifier update notification message that is received for the first time may be a positioning configuration response frame, the subsequently received identifier update notification message is a location track notification frame, and the subsequent message is a subsequent location track notification frame.

A wireless terminal may periodically or aperiodically send an identifier update notification message to an AP, to instruct the AP to periodically or aperiodically update an identifier of the wireless terminal. In this way, an value of an identifier field, in a subsequent message received by the AP, for the wireless terminal is not fixed; exposing and tracing of a location of a wireless terminal that are caused due to a fixed value of an identifier field, in a message, for the wireless terminal can be avoided, effectively protecting location privacy of a user that uses the wireless terminal.

Figure 3:
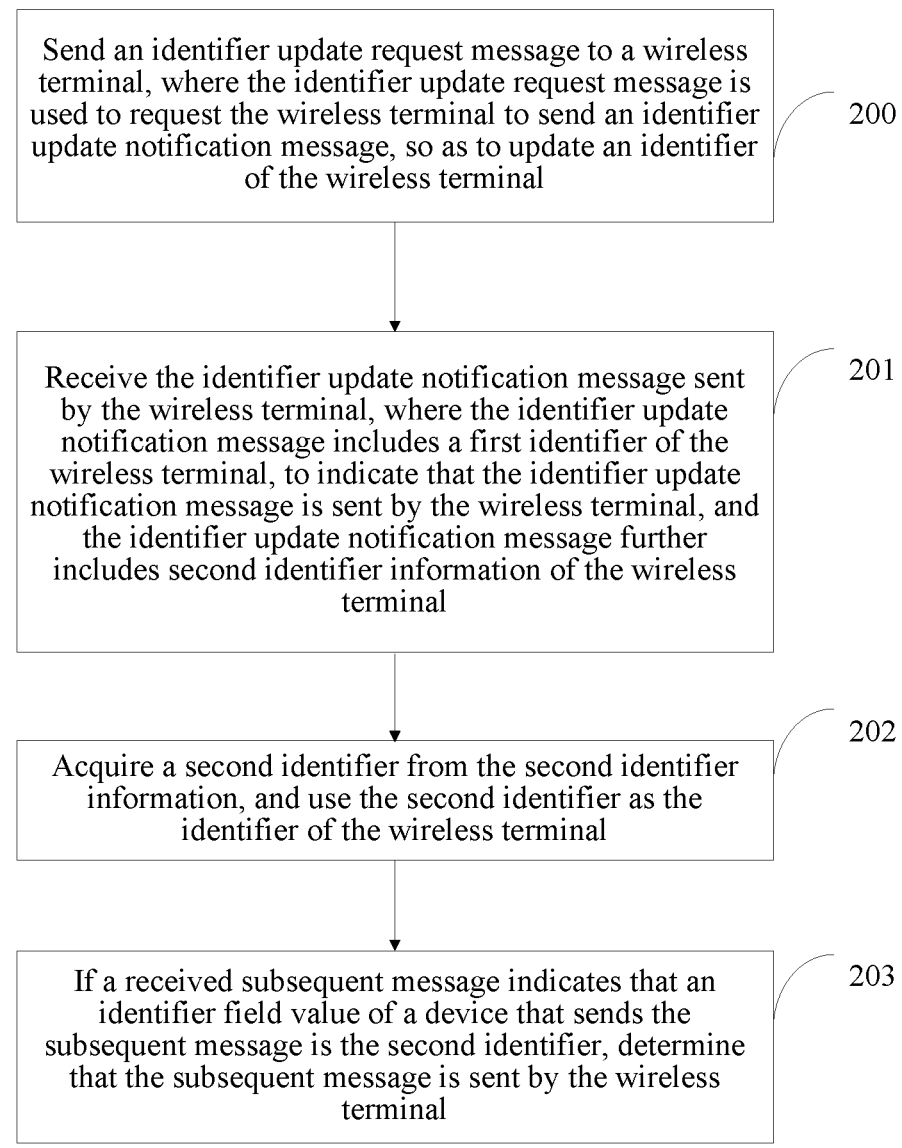
FIG. 3 is still another flowchart of a location privacy protection method according to an embodiment of the present disclosure.

In addition, before step 201, the location privacy protection method applied to an AP in this embodiment of the present disclosure may further include step 200, as shown in FIG. 3, so as to implement that the AP triggers the wireless terminal to update the identifier.

Step 200: Send an identifier update request message to the wireless terminal, where the identifier update request message is used to request the wireless terminal to send the identifier update notification message, so as to update the identifier of the wireless terminal.

The wireless terminal may directly send the identifier update notification message to the AP after receiving the identifier update request message, or send the identifier update notification message to the AP after a set identifier update time in the identifier update request message arrives.

The set identifier update time may include validity period information of the first identifier, that is, a currently used identifier, or second identifier update time information. An identifier update notification message may be periodically or aperiodically sent by setting a validity period of the first identifier, that is, a current identifier, or a time for sending the identifier update notification message to update the identifier.

In the foregoing location privacy protection method shown in FIG. 1 to FIG. 3, the second identifier in the second identifier information may be the second identifier that is encrypted. Certainly, in addition to including the second identifier that is encrypted, the second identifier information may further include first identifier validity period information or second identifier update time information, so that the AP learns, according to the first identifier validity period information or the second identifier update time information, a time when the wireless terminal updates the identifier.

The first identifier validity period information or the second identifier update time information may be encrypted or not encrypted. Before encryption, the wireless terminal first receives an identifier update key from the AP, and encrypts the second identifier using the identifier update key. In addition, the identifier update key may further be used to encrypt the first identifier validity period information or the second identifier update time information in the second identifier information.

In the foregoing method embodiments shown in FIG. 1, FIG. 2 and FIG. 3, the wireless terminal automatically generates the identifier update notification message to update the identifier of the wireless terminal. The following method embodiments describe that an AP generates an identifier update notification message to instruct a wireless terminal to update an identifier. Descriptions are made below separately from the perspectives of an AP side and a wireless terminal side.

Figure 4:
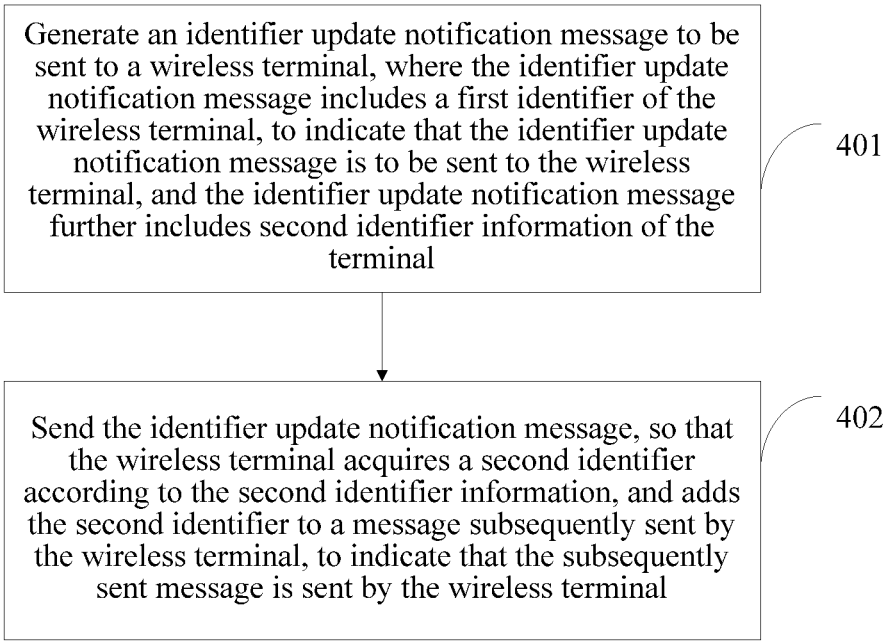
FIG. 4 is still another flowchart of a location privacy protection method according to an embodiment of the present disclosure.

Refer to FIG. 4, which shows still another flowchart of a location privacy protection method according to an embodiment of the present disclosure, where the location privacy protection method is applied to an AP and may include the following steps.

Step 401: Generate an identifier update notification message to be sent to a wireless terminal.

It is understandable that, the AP may be connected to multiple wireless terminals. Therefore, the identifier update notification message generated by the AP includes a first identifier of the wireless terminal, to indicate that which wireless terminal the identifier update notification message is to be sent to. The identifier update notification message further includes second identifier information of the wireless terminal, where the information is used to notify the wireless terminal of an updated identifier.

Step 402: Send the identifier update notification message, so that the wireless terminal acquires a second identifier according to second identifier information. In this way, the wireless terminal may use the second identifier as an identifier of the wireless terminal, and add the second identifier to a message subsequently sent by the wireless terminal, to indicate that the subsequently sent message is sent by the wireless terminal.

In this embodiment of the present disclosure, a first identifier in an identifier update notification message that is generated by the AP for the first time may be a fixed MAC address of the wireless terminal or an AID that is initially allocated by the AP to the wireless terminal; a corresponding second identifier may be a temporary MAC address or an updated AID that is allocated to the wireless terminal. The temporary MAC address and the updated AID of the wireless terminal are generated by the AP.

In a subsequently generated identifier update notification message, a first identifier is a second identifier in an identifier update notification message that is generated last time, and a second identifier in the subsequently generated identifier update notification message may be another temporary MAC address or another updated AID that is subsequently allocated by the AP to the wireless terminal.

It can be seen from the foregoing technical solution that, an AP may periodically or aperiodically send an identifier update notification message to a wireless terminal, to update an identifier of the wireless terminal, so that an a value of an identifier field, in a subsequent message, for the wireless terminal is not fixed; in this way, exposing and tracing of a location of a wireless terminal that are caused due to a fixed value of an identifier field, in a message, for the wireless terminal can be avoided, effectively protecting location privacy of a user that uses the wireless terminal.

In this embodiment of the present disclosure, a feasible manner in which the AP aperiodically sends an identifier update notification message may be detecting a moving track intersection event between the wireless terminal and another wireless terminal, and if it is detected that a moving track intersection event occurs between the wireless terminal and the another wireless terminal, sending the identifier update notification message, where the another wireless terminal is a wireless terminal that is also managed by the AP to perform an identifier update, and is usually a wireless terminal associated with the AP; or a wireless terminal that is managed by another AP on a same network as the AP to perform an identifier update, for example, a wireless terminal associated with the another AP; in this case, an upstream entity of the AP may detect the moving track intersection event, and the identifier update of the another wireless terminal is performed after the another AP sends an identifier update notification message.

At the same time when the AP sends an identifier update notification message to a wireless terminal, the AP may further send another identifier update notification message to another wireless terminal that is also managed by the AP, so that a message subsequently sent by the another wireless terminal includes a respective second identifier, to indicate a sending terminal that sends the message.

It is understandable that, the same time refers to that multiple identifier update notification messages are sent within a short time. An AP sends an address update notification frame to wireless terminals associated with the AP one by one, and transmission is successively performed from a micro perspective, but the AP can complete the transmission in a time that is short enough. Therefore, from a macro perspective, the identifier update notification messages may be understood as being sent at the same time. The time that is short enough may be within several seconds. It is better that the time is within 1 second, with a preference to a shorter timescale.

A feasible manner in which the AP periodically sends an identifier update notification message may be independently setting, by the AP, a time for sending an identifier update notification message to each wireless terminal, and sending a next identifier update notification message after a sending time arrives, so as to update the identifier of the wireless terminal.

Figure 5:
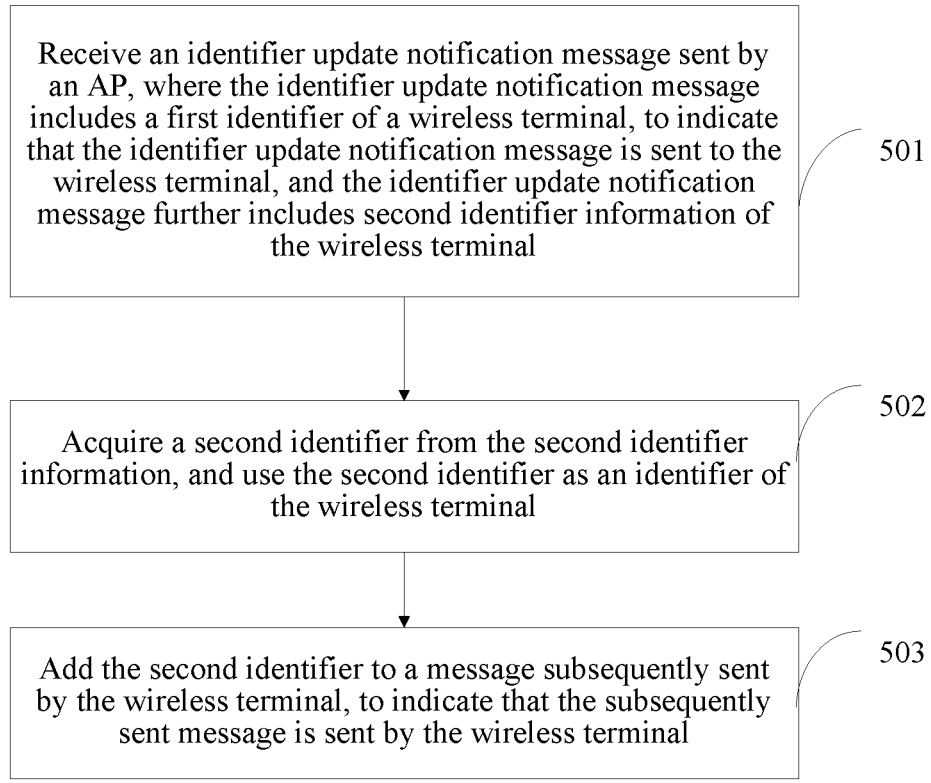
FIG. 5 is still another flowchart of a location privacy protection method according to an embodiment of the present disclosure.

Corresponding to the method embodiment shown in FIG. 4, an embodiment of the present disclosure further provides a location privacy protection method applied to a wireless terminal. A flowchart of the method is shown in FIG. 5, and the method may include the following steps.

Step 501: Receive an identifier update notification message sent by an AP, where the identifier update notification message includes a first identifier of the wireless terminal, to indicate that the identifier update notification message is sent to the wireless terminal; and the identifier update notification message further includes second identifier information of the wireless terminal.

In this embodiment of the present disclosure, the AP may periodically or aperiodically send the identifier update notification message. A feasible manner of periodically sending an identifier update notification message is independently setting, by the AP, a time for sending an identifier update notification message to each wireless terminal, and sending a next identifier update notification message after a sending time arrives, so as to update an identifier of the wireless terminal.

A feasible manner of aperiodically sending an identifier update notification message is, if the AP detects that a moving track intersection event occurs between the wireless terminal and another wireless terminal, sending, by the AP, the identifier update notification message.

Step 502: Acquire a second identifier from the second identifier information, and use the second identifier as an identifier of the wireless terminal.

For specific content of the first identifier and the second identifier, reference may be made to the related description in the method embodiment shown in FIG. 4, which is not described again in this embodiment of the present disclosure.

Step 503: Add the second identifier to a message subsequently sent by the wireless terminal, to indicate that the subsequently sent message is sent by the wireless terminal.

The message subsequently sent by the wireless terminal includes a new identifier (that is, the second identifier) of the wireless terminal. Therefore, after receiving the message subsequently sent by the wireless terminal, the AP may determine, using the second identifier, that the subsequent message is sent by which wireless terminal.

Further, the identifier (that is, the second identifier) of the wireless terminal is updated after the identifier update notification message sent by the AP is received. Therefore, in the message subsequently sent by the wireless terminal, the identifier of the wireless terminal may be updated periodically or aperiodically, so that an value of an identifier field, in a message exchanged between the wireless terminal and the AP, for the wireless terminal is not fixed; in this way, exposing and tracing of a location of a wireless terminal that are caused due to a fixed value of an identifier field, in a message, for the wireless terminal can be avoided, effectively protecting location privacy of a user that uses the wireless terminal.

In the foregoing method embodiments shown in FIG. 4 and FIG. 5, the identifier update notification message may further include identifier update time information, and after an identifier update time arrives, the wireless terminal updates the identifier, that is, uses the second identifier in the identifier update notification message as the identifier of the wireless terminal, where the identifier update time information may include validity period information of the first identifier, that is, a currently used identifier, or second identifier update time information, that is, information about a time for updating the identifier of the wireless terminal to the second identifier.

In addition, the location privacy protection method provided by this embodiment of the present disclosure may be applied to an IEEE 802.11 MAC layer positioning process. In the process, the identifier update notification message may be a positioning configuration request frame.

The second identifier in the identifier update notification message is encrypted using a key, where the key is a key of a point-to-point session between the AP and the wireless terminal, for example, a pairwise transient key (PTK) between nodes. The session key may further be used to encrypt the first identifier validity period information or the second identifier update time information.

The location privacy protection method provided by this embodiment of the present disclosure is described in detail below, using an example in which a wireless terminal communicate with an AP in an IEEE 802.11 MAC layer positioning process and a second identifier is used as a temporary MAC address (also temporary address for short) of the wireless terminal.

Figure 6:
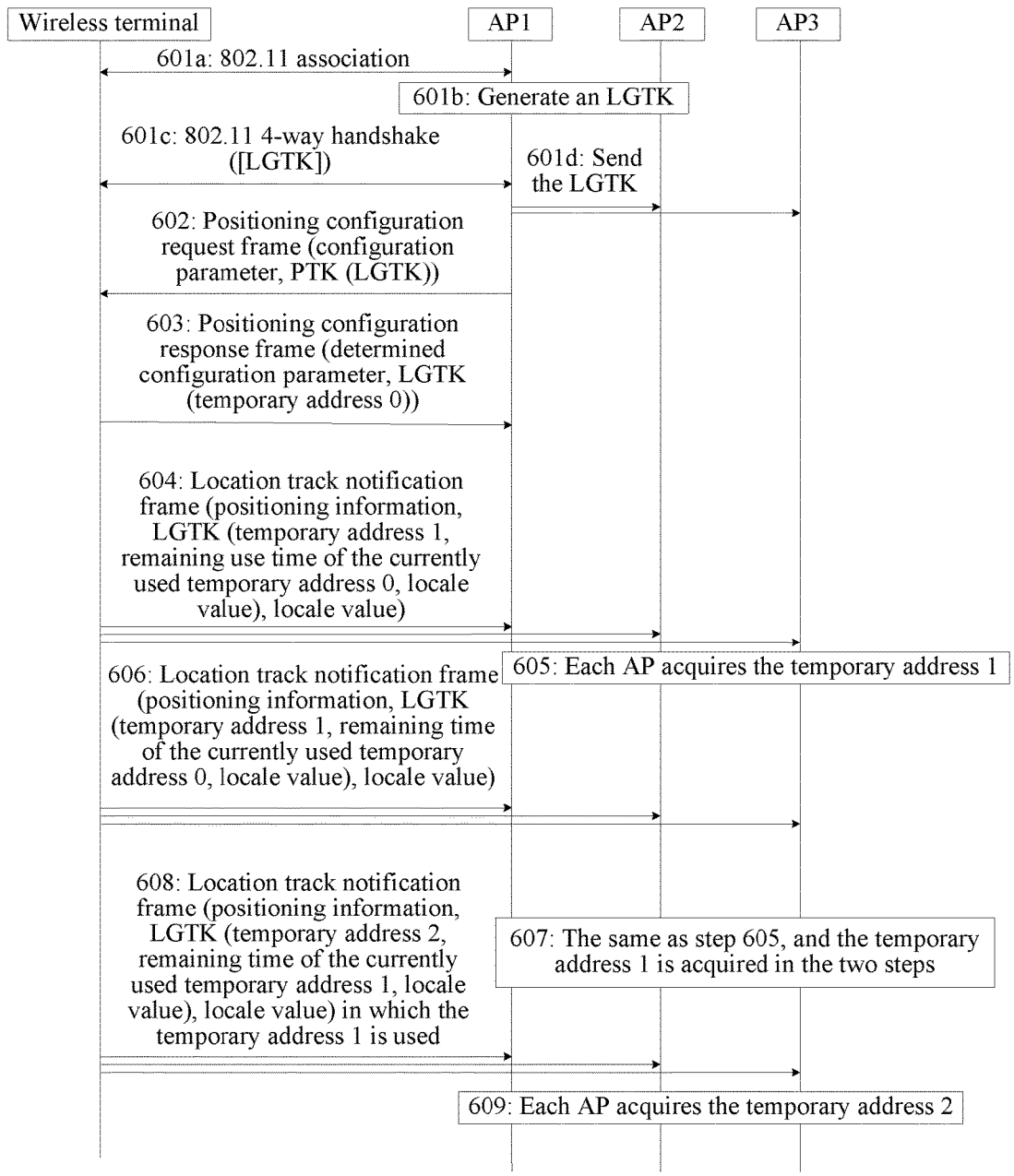
FIG. 6 is still another flowchart of a location privacy protection method according to an embodiment of the present disclosure.

Refer to FIG. 6, which shows that in an IEEE 802.11 MAC layer positioning process, a wireless terminal sends, to an AP, a location track notification frame that is used as an identifier update notification message, so as to update an identifier of the wireless terminal in a subsequent message. The positioning process may include the following steps.

Steps 601a-601d: The wireless terminal establishes a security connection to an AP 1.

When positioning of the wireless terminal is performed, the wireless terminal first needs to establish a connection to an AP, so as to obtain a positioning configuration in a following step. An authentication and key distribution process is necessary for the establishment of the security connection between the wireless terminal and the AP 1. The process may include an 802.11 association (601a), optional Extensible Authentication Protocol (EAP)-based authentication (not shown in the figure), an 802.11 4-way handshake (601c), and a process (601b) of generating a Location Group Temporal Key (LGTK) that is used to protect location privacy of the wireless terminal.

The 4-way handshake is a part of the authentication between the wireless terminal and the AP 1, and completes negotiation on a PTK at the same time, where the PTK is used to protect unicast communication between the wireless terminal and the AP 1. In addition, another piece of configuration information is transferred by the AP 1 to the wireless terminal in a third message of the 4-way handshake. The another piece of configuration information in the prior art may include a group transient key (GTK) that is used to protect a downlink multicast packet sent by the AP 1 to each wireless terminal connected to the AP 1, where the GTK may be encrypted using the PTK, so as to be secretly transmitted.

In this embodiment of the present disclosure, the another piece of configuration information described above may further include an LGTK that is used to protect an uplink multicast packet sent by the wireless terminal to multiple APs, where the LGTK is encrypted using a key, for example, the PTK, of a point-to-point session between the wireless terminal and the AP 1, so as to be secretly transmitted.

Certainly, the LGTK may also be sent by the AP 1 to the wireless terminal in another manner. For example, as described in the following step 602, the LGTK is sent to the wireless terminal using a positioning configuration request frame. Alternatively, after an upstream device such as a positioning server of an AP generates the LGTK, the upstream device distributes the LGTK to APs, including the AP 1, on a same network, and then the AP 1 sends the LGTK to the wireless terminal.

When the AP 1 generates the LGTK (601*b*), the AP 1 may further send the generated LGTK to another AP on the same network (601*d*). The LGTK may be used to encrypt a temporary MAC address, so as to improve security of the temporary MAC address.

The AP on the same network refers to a group of APs that can communicate with each other. On the network, there may be a positioning server, and the positioning server may send information about an AP on the same network to every other AP. In this way, after an AP generates an LGTK, the LGTK may be sent to another AP according to information about the AP on the same network.

Step 602: The AP 1 sends a positioning configuration request frame to the wireless terminal, where the positioning configuration request frame includes a configuration parameter and an LGTK.

In this embodiment of the present disclosure, the configuration parameter may include information such as a channel, a multicast address, and a period. Reference may be made to the related description in the background for specific definitions. If the AP 1 has sent an LGTK to the wireless terminal in the 4-way handshake process or at another moment, the LGTK is not updated at this moment. Therefore, the positioning configuration request frame may not include the LGTK. The LGTK may be transmitted after being encrypted using the PTK.

Step 603: The wireless terminal sends a positioning configuration response frame to the AP 1.

The positioning configuration response frame indicates that the wireless terminal accepts or refuses a positioning configuration request. In addition, optionally, the positioning configuration response frame may include a determined positioning configuration parameter and a temporary MAC address, that is, a temporary address 0. The temporary MAC address is a second identifier, and the temporary MAC address may be encrypted using the PTK. Because the positioning configuration response frame is a unicast frame sent by the wireless terminal to an associated AP, that is, the AP 1, content included in the positioning configuration response frame may be encrypted using the PTK.

When receiving the positioning configuration response frame, the AP 1 may obtain, from the positioning configuration response frame, the temporary MAC address that is to be subsequently used by the wireless terminal, and subsequently receive a location track notification frame including the temporary MAC address. The temporary MAC address corresponds to a fixed MAC address (a first identifier) of the wireless terminal, so that the AP 1 knows a real identity of the temporary MAC address. Moreover, the AP 1 needs to send the temporary MAC address to another AP on the same network, so that the another AP also knows the real identity of the temporary MAC address.

Step 604: The wireless terminal sends a location track notification frame for the first time.

If the positioning configuration response frame does not carry information about the subsequently used temporary MAC address, presence in a sending address field in a frame header of the location track notification frame that is sent by the wireless terminal for the first time is still an address, for example, the fixed MAC address of the wireless terminal, used by the wireless terminal last time. Otherwise, the wireless terminal may use the temporary MAC address, that is, the temporary address 0, in the sending address field in the frame header of the location track notification frame that is sent for the first time.

In addition, a receiving address in the location track notification frame is a multicast address specified in the positioning configuration request frame. The location track notification frame may further include positioning information and a next temporary MAC address, that is, a temporary address 1. Optionally, the location track notification frame may further include a remaining use time of a current address such as the temporary address 0 or a time for starting using a next temporary address such as the temporary address 1.

The temporary address 1 and the remaining use time of the currently used temporary address 0 or the time for starting using the temporary address 1 may be encrypted using the LGTK. Certainly, the remaining use time of the currently used temporary address 0 or the time for starting using the temporary address 1 may also be not encrypted.

Certainly, a valid time of the temporary MAC address may also be pre-agreed. In this way, the location track notification frame does not need to carry related time information, so as to reduce a length of the frame. Alternatively, the wireless terminal periodically or aperiodically adds a next temporary MAC address to the location track notification frame, to instruct a next location track notification frame to use the indicated next temporary MAC address. Otherwise, a current temporary MAC address is still used in the next location track notification frame.

Further, in order to make it more difficult for an illegal tracer to trace a location of the wireless terminal, the location track notification frame may further include a locale value. The locale value appears as plaintext, and is also involved in encryption calculation of the temporary MAC address, so that ciphertext of the temporary MAC address is different even though the temporary MAC address is encrypted using a same key each time. The locale value may also be encrypted together with the temporary MAC address, so that after performing decryption, the AP 1 confirms a decryption result by comparing the locale value with the plaintext locale value. The locale value may be a random number or a simply increasing or decreasing numerical value.

The foregoing positioning information is used to perform positioning on the wireless terminal, and the positioning information may be null. The multiple APs may obtain, through measurement, receive power for receiving the location track notification frame, and estimate the location of the wireless terminal using signal strength. The positioning information may also include information about a sending time and a receiving time, where the sending time is a time when the wireless terminal sends the location track notification frame, and the receiving time is a time when the AP receives the location track notification frame. The AP calculates a propagation time of the location track notification frame according to the sending time and the receiving time.

After obtaining multiple propagation times, the multiple APs obtain location information of the wireless terminal according to a triangulation principle.

In addition, the wireless terminal may also send the temporary address 1 and the remaining use time of the currently used temporary address 0 or the time for starting using the temporary address 1 using an independent frame, instead of adding the temporary address 1 and the remaining use time of the currently used temporary address 0 or the time for starting using the temporary address 1 to the location track notification frame.

However, when configuring a parameter for the wireless terminal, the AP specifies a sending rule for sending the location track notification frame by the wireless terminal, but does not specify a sending rule for the independent frame. Therefore, when the independent frame is being sent, the AP may be switched to another channel to execute another task. In this case, the independent frame cannot be received by all APs, which results in an error in an address update. Therefore, in this embodiment of the present disclosure, the foregoing information is preferably included in the location track notification frame.

Step 605: The AP 1 and another AP receive the location track notification frame, and obtain a temporary address 1.

The AP 1 and the another AP, such as an AP 2 or an AP 3 in the figure, are on the same network, and belong to the group indicated by the multicast address indicated in the positioning configuration request frame. Therefore, all of the AP 1 to the AP 3 can receive the location track notification frame sent by the wireless terminal.

In addition to performing positioning, the AP 1 to the AP 3 may further decrypt, using the LGTK, information, for example, the temporary address 1, encrypted by the wireless terminal, obtain the temporary address 1 from the information, and verify whether a decryption result is correct according to the locale value.

The AP 1 to the AP 3 may establish a correspondence according to the address, currently used by the wireless terminal, included in the frame header of the location track notification frame and the temporary address 1 included in the frame, so as to determine an identity of the wireless terminal according to the correspondence.

Step 606: The wireless terminal sends a location track notification frame again. Because the temporary address 1 in the location track notification frame that is sent last time is still valid, an address in a frame header of the location track notification frame that is sent again is unchanged, what is encrypted in the frame is still the temporary address 1 in step 604; however, the remaining use time of a currently used temporary address 0 is changed, and the locale value is also changed.

Step 607: The same as step 605, and the temporary address 1 is acquired in step 607 and step 605.

Step 608: The wireless terminal sends a location track notification frame again. However, for this time, because the temporary address 1 in the location track notification frame that is sent last time comes into effect, a sending address in a frame header is the encrypted temporary address 1 in the location track notification frame in step 606, and what is encrypted in the frame is a new next temporary MAC address, that is, a temporary address 2.

Step 609: The same as step 605, and the temporary address 2 is acquired in step 609.

Using the foregoing method, a wireless terminal may periodically or aperiodically update a temporary MAC address, so that a real identity is not exposed, achieving an objective of protecting location privacy. In addition, a changing locale value is used in encryption of the temporary MAC address, so that encryption results of the same temporary MAC address are different, and so that, an address changing rule is not easily detected, protecting location privacy in a more effective manner.

Figure 7:
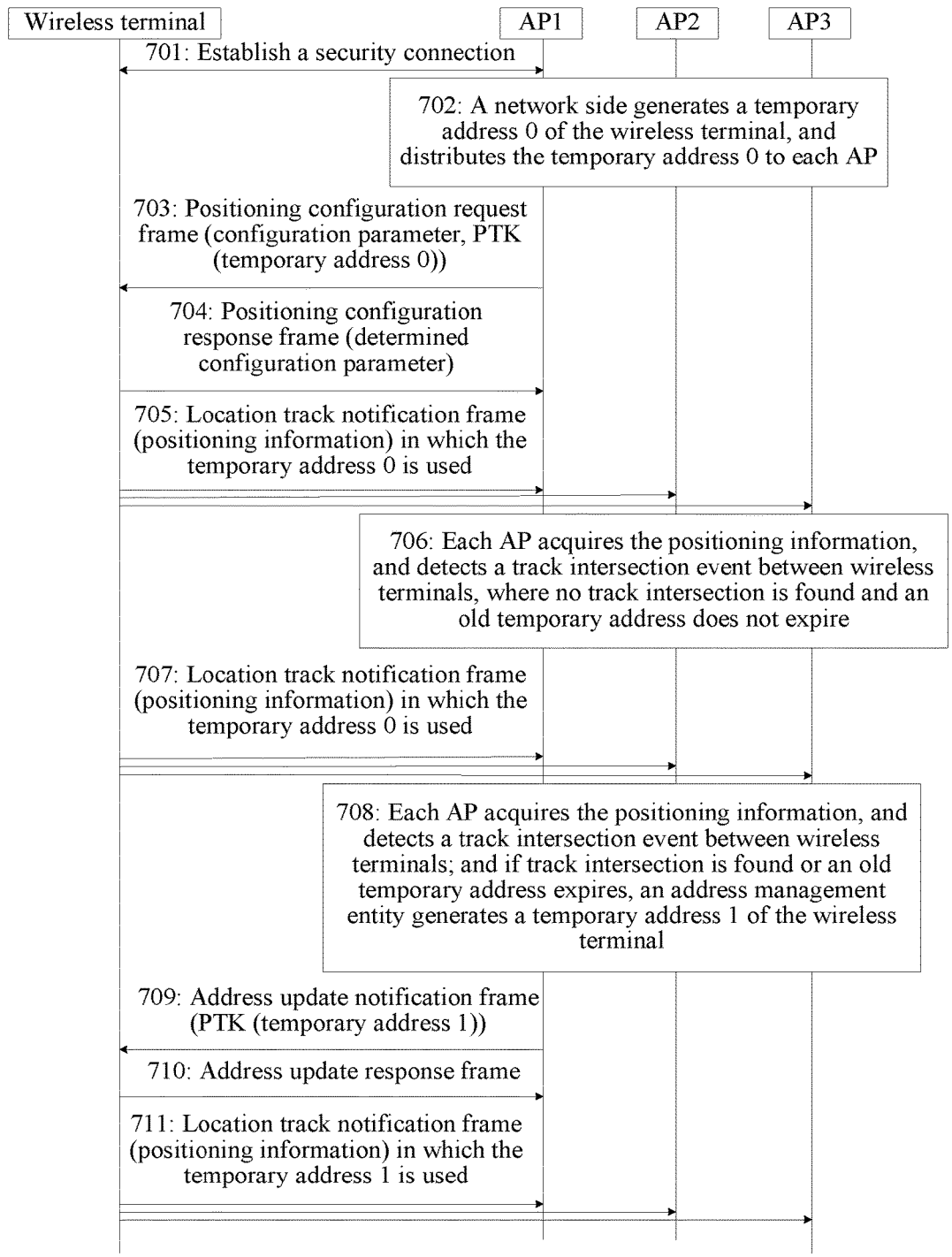
FIG. 7 is still another flowchart of a location privacy protection method according to an embodiment of the present disclosure.

A location privacy protection method provided by an embodiment of the present disclosure in an IEEE 802.11 MAC layer positioning process is described in detail below from the perspective of that an AP generates a temporary MAC address. As shown in FIG. 7, the method may include the following.

Step 701: A wireless terminal is associated with an AP 1, and establishes a security connection to the AP 1.

Step 702: A network side generates a first temporary MAC address, that is, a temporary address 0, for the wireless terminal.

The AP 1 associated with the wireless terminal generates the temporary address 0 for the wireless terminal, and sends the temporary address 0 to another AP such as an AP 2 or an AP 3 on a same network; or an upstream entity, for example, an address management entity, of the AP on the network side generates the temporary address 0, and delivers the temporary address 0 to APs, including the AP 1, on the network.

Step 703: The AP 1 sends a positioning configuration request frame to the wireless terminal. This step is similar to step 603, and a difference lies in that, in this embodiment, the AP 1 generates the temporary address 0 for the wireless terminal, and therefore, the AP 1 may add the temporary address 0 to the positioning configuration request frame, and performs encryption using a PTK. In addition, an LGTK is unnecessary in this embodiment of the present disclosure. Therefore, the positioning configuration request frame does not need to include an LGTK.

Step 704: The wireless terminal sends a positioning configuration response frame to the AP 1, to indicate that a positioning configuration request is accepted.

Step 705: The wireless terminal sends a location track notification frame. If the positioning configuration request frame includes the temporary address 0, the wireless terminal sends the location track notification frame using the temporary address 0 as a sending address. Otherwise, the wireless terminal sends the location track notification frame still using an original sending address.

Step 706: After each AP receives the location track notification frame, an entity, for example, a positioning server, on the network side completes positioning on the wireless terminal according to positioning information in the location track notification frame received by the AP. Reference may be made to step 604 for details. In addition, the entity on the network side may determine whether a moving track intersection event occurs between wireless terminals with reference to a moving track of the wireless terminal and an update status of a temporary MAC address. If no moving track intersection event occurs, and the temporary MAC address does not expire or is not about to expire, it is unnecessary to update the temporary MAC address of the wireless terminal.

If an intersection event occurs, determining is further performed with reference to the update status of the temporary MAC address, where the update status of the temporary MAC address refers to whether the address is just updated. If the address is just updated, it is unnecessary to update the address when the track intersection event occurs. Otherwise, the address needs to be updated.

The entity on the network side may include a positioning entity and an address management entity. The positioning entity is configured to complete positioning and detect whether a moving track intersection event occurs, and the address management entity is configured to complete an address update of the wireless terminal. The positioning entity and the address management entity may be a same entity, and may be independent of the AP and act as an upstream entity of the AP, or may be an AP connected to the wireless terminal.

Step 707: The wireless terminal sends a location track notification frame still using the temporary address 0.

Step 708: The same as step 706, but in this step, a moving track intersection event occurs between wireless terminals or the temporary address 0 of the wireless terminal expires or is about to expire. Therefore, the entity on the network side generates a next temporary MAC address, that is, a temporary address 1, for the wireless terminal, and sends the next temporary MAC address to APs including the AP 1.

Step 709: The AP 1 sends an address update notification frame to the wireless terminal. A receiving address of the address update notification frame is the temporary address 0, and the frame includes the temporary address 1 encrypted using a PTK. The address update notification frame may further include a piece of time information, indicating a time that the temporary address 1 starts to come into effect.

The AP 1 may also send the address update notification frame to multiple wireless terminals at the same time, so that the multiple wireless terminals update addresses at the same time, to improve an effect of location privacy protection. For example, the AP 1 detects that moving track intersection occurs between the wireless terminal and at least one of other wireless terminals, and the AP 1 sends the address update notification frame to corresponding wireless terminals, so that multiple wireless terminals update addresses at the same time after receiving the address update notification frame; or the AP 1 instructs, using the sent address update notification frame, each wireless terminal to update an address at the same time point.

It is understandable that, a meaning of updating addresses at the same time refers to completing an address update within a short time. One AP needs to send an address update notification frame to wireless terminals associated with the AP one by one, and the AP successively sends the address update notification frame to the wireless terminals from a micro perspective, but the AP can complete the address update of the wireless terminals in a time that is short enough. Therefore, from a macro perspective, the address update may be understood as being performed at the same time. The time that is short enough may be within several seconds. It is better that the time is within 1 second and even 10 milliseconds, with a preference to a shorter timescale.

Step 710: The wireless terminal sends an address update response frame to an AP, to indicate that the temporary address 1 is received. It should be further noted that, in a moving process, the wireless terminal may leave a range of the AP that is originally connected, and need to establish a security connection to a new connectable AP. Therefore, the AP that sends the address update notification frame to the wireless terminal in step 709 may not be the AP 1 that is originally connected to the wireless terminal. The address update notification frame may be a positioning configuration request frame, but only the temporary MAC address is configured this time. Correspondingly, the address update response frame fed back by the wireless terminal may be a positioning configuration response frame.

Step 711: The wireless terminal sends a location track notification frame using the temporary address 1 as a sending address.

If the address update notification frame does not include information about a time when the temporary address 1 comes into effect, the wireless terminal may use the temporary address 1 in a next location track notification frame after receiving the address update notification frame, or may use the temporary address 1 according to an agreed time rhythm.

If the address update notification frame includes the information about the time when the temporary address 1 comes into effect, the temporary address 1 is used in the location track notification frame after the time when the temporary address 1 comes into effect arrives. Using the temporary address 1 in the location track notification frame refers to filling the temporary address 1 in a sending address in a frame header of the location track notification frame.

It may be known based on the foregoing description that, an AP periodically or aperiodically changes a temporary MAC address of a wireless terminal, to protect location privacy of the wireless terminal. In addition, the AP may update, in a timely manner when moving track intersection occurs between wireless terminals, a temporary MAC address of each wireless terminal on which track intersection occurs, so that a correspondence between temporary MAC addresses before and after the address of the wireless terminal is changed is difficult to be determined, better protecting location privacy of the wireless terminal.

It should be noted herein that, in the foregoing method embodiments shown in FIG. 6 and FIG. 7, the location privacy protection method provided by the embodiments of the present disclosure is described using an IEEE 802.11 MAC layer positioning process, and involves a frame and an address at a MAC layer. An actual location privacy problem is not limited to the frame at the MAC layer, and may also exist in a message at any layer. In addition, in an actual application, a temporary MAC address of a terminal is not necessarily used as an identifier of the terminal in a message. For example, a temporary AID of the wireless terminal may also be used as the identifier of the wireless terminal.

Further, in an actual application, in order that protecting location privacy is not limited to updating the identifier of the wireless terminal in the positioning process, the identifier update notification message is not limited to be sent in the positioning process, and may also be periodically or aperiodically sent in a case in which there is no positioning process, so as to effectively protect location privacy of a user that uses the wireless terminal.

Figure 8:
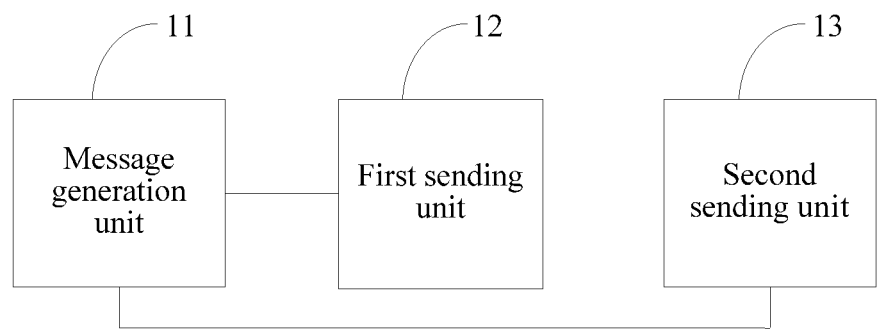
FIG. 8 is a schematic structural diagram of a location privacy protection apparatus according to an embodiment of the present disclosure.

Corresponding to the method embodiment shown in FIG. 1, an embodiment of the present disclosure further provides a location privacy protection apparatus, which is applied to a wireless terminal. A schematic structural diagram of the location privacy protection apparatus is shown in FIG. 8, and the location privacy protection apparatus may include a message generation unit 11, a first sending unit 12, and a second sending unit 13.

The message generation unit 11 is configured to generate an identifier update notification message to be sent to at least one access point.

In this embodiment of the present disclosure, the identifier update notification message is used to notify the AP that an identifier of the wireless terminal is changed. Usually, the wireless terminal is associated with an AP. Therefore, the wireless terminal may send, using a unicast message, the identifier update notification message to the AP associated with the wireless terminal. In some special application occasions, for example, in a positioning process, the wireless terminal may send an identifier update notification message to multiple APs on a network using a multicast or broadcast message.

Each identifier update notification message may include a first identifier of the wireless terminal, where the first identifier is used, in the identifier update notification message, as the identifier of the wireless terminal, and is used to indicate that the identifier update notification message is to be sent by the wireless terminal. The identifier update notification message may further include second identifier information of the wireless terminal, where the information is used to notify the AP of an updated identifier of the wireless terminal.

Further, the message generation unit 11 may periodically or aperiodically generate the identifier update notification message.

The first sending unit 12 is configured to send the identifier update notification message, so that the access point acquires a second identifier according to the second identifier information, and uses the second identifier as an identifier of the wireless terminal.

In this embodiment of the present disclosure, each time the message generation unit 11 generates an identifier update notification message, the first sending unit 12 is triggered to send the identifier update notification message. Reference may be made to the description in the method embodiment for specific parameters that are used by the wireless terminal as the first identifier and the second identifier.

In addition, the first sending unit may periodically or aperiodically send the identifier update notification message. A specific manner may be sending the identifier update notification message after receiving an identifier update request message sent by the access point; or sending the identifier update notification message after a set identifier update time in an identifier update request message arrives, where the set identifier update time may include validity period information of the first identifier, that is, a currently used identifier, or second identifier update time information, that is, information about a time for sending the identifier update notification message to update the identifier. Alternatively, the wireless terminal determines an identifier update time.

An identifier update notification message may be periodically or aperiodically sent using a set validity period of the first identifier, that is, a current identifier, or a set time for sending the identifier update notification message to update the identifier. Similarly, the AP may also periodically or aperiodically send an identifier update request message, to instruct the wireless terminal to send the identifier update notification message, thereby periodically or aperiodically updating the identifier of the wireless terminal.

The second sending unit 13 is configured to send a subsequent message to the access point, where the subsequent message includes the second identifier, to indicate that the subsequent message is sent by the wireless terminal.

It can be seen from the foregoing technical solution that, a first sending unit 12 may periodically or aperiodically send an identifier update notification message, so as to instruct, when updating an identifier of a wireless terminal, an AP to update the identifier of the wireless terminal associated with the AP, so that a value of an identifier field, in a subsequent message, for the wireless terminal is not fixed; in this way, exposing and tracing of a location of a wireless terminal that are caused due to a fixed value of an identifier field, in a message, for the wireless terminal can be avoided, effectively protecting location privacy of a user that uses the wireless terminal.

Figure 9:
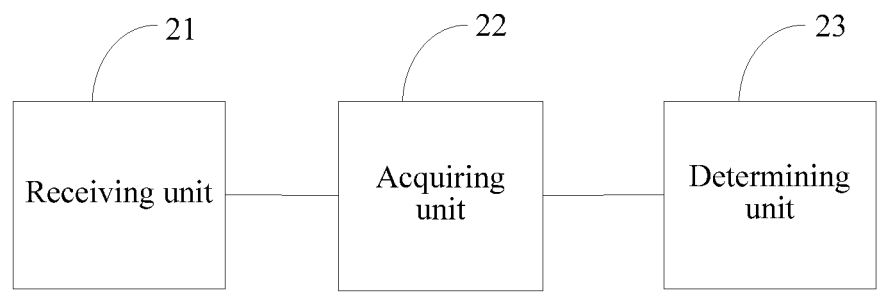
FIG. 9 is another schematic structural diagram of a location privacy protection apparatus according to an embodiment of the present disclosure.

Corresponding to the method embodiment shown in FIG. 2 and the apparatus embodiment shown in FIG. 8, an embodiment of the present disclosure further provides a location privacy protection apparatus applied to an AP. A schematic structural diagram of the location privacy protection apparatus is shown in FIG. 9, and the location privacy protection apparatus may include a receiving unit 21, an acquiring unit 22, and a determining unit 23.

The receiving unit 21 is configured to receive an identifier update notification message sent by a wireless terminal, where the identifier update notification message includes a first identifier of the wireless terminal, to indicate that the identifier update notification message is sent by the wireless terminal; and the identifier update notification message further includes second identifier information of the wireless terminal.

The acquiring unit 22 is configured to acquire a second identifier from the second identifier information, and use the second identifier as an identifier of the wireless terminal.

In this embodiment of the present disclosure, in the first identifier update notification message received by the AP, a first identifier may be a fixed MAC address of the wireless terminal or an AID that is initially allocated by the AP to the wireless terminal; a corresponding second identifier may be a temporary MAC address or an updated AID of the wireless terminal. The temporary MAC address and the updated AID of the wireless terminal may be generated by the wireless terminal.

In a subsequently received identifier update notification message, a first identifier is a second identifier in an identifier update notification message that is received last time, and a second identifier in the subsequently received identifier update notification message may be another temporary MAC address or another updated AID that is subsequently generated by the wireless terminal.

The determining unit 23 is configured to, if a value of an identifier field, in a received subsequent message, that indicates a device that sends the subsequent message is the second identifier, determine that the subsequent message is sent by the wireless terminal.

Figure 10:
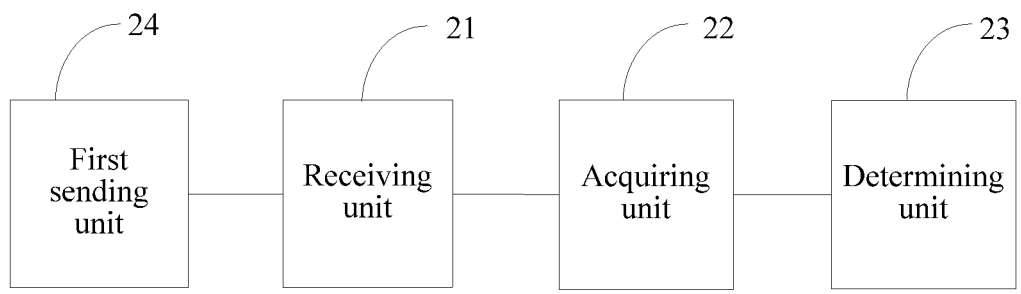
FIG. 10 is still another schematic structural diagram of a location privacy protection apparatus according to an embodiment of the present disclosure.

Further, the location privacy protection apparatus provided by this embodiment of the present disclosure may further include a first sending unit 24, as shown in FIG. 10. The first sending unit 24 is configured to send an identifier update request message to the wireless terminal, where the identifier update request message is used to request the wireless terminal to send the identifier update notification message, so as to update the identifier of the wireless terminal.

The wireless terminal may directly send the identifier update notification message to the AP after receiving the identifier update request message, or send the identifier update notification message to the AP after a set identifier update time in the identifier update request message arrives.

The set identifier update time may include validity period information of the first identifier, that is, a currently used identifier, or second identifier update time information. An identifier update notification message may be periodically or aperiodically generated by setting a validity period of the first identifier, that is, a current identifier, or a time for sending the identifier update notification message to update the identifier.

It can be known from the foregoing technical solution that, a wireless terminal may periodically or aperiodically send an identifier update notification message to a receiving unit 21 of a location privacy protection apparatus applied to an AP, to instruct the AP to periodically or aperiodically update an identifier of the wireless terminal, so that a value of an identifier field, in a subsequent message received by the AP, for the wireless terminal is not fixed; exposing and tracing of a location of a wireless terminal that are caused due to a fixed value of an identifier field, in a subsequent message, for the wireless terminal can be avoided, effectively protecting location privacy of a user that uses the wireless terminal.

In the foregoing location privacy protection apparatuses shown in FIG. 8, FIG. 9 and FIG. 10, the second identifier information may include the second identifier that is encrypted. Certainly, in addition to including the second identifier that is encrypted, the second identifier information may further include first identifier validity period information or second identifier update time information, so that the AP learns, according to the first identifier validity period information or the second identifier update time information, a time when the wireless terminal updates the identifier. The first identifier validity period information or the second identifier update time information may be encrypted or not encrypted.

A specific encryption process of the second identifier and the first identifier validity period information or the second identifier update time information may be that the second sending unit of the location privacy protection apparatus applied to the AP sends an identifier update key, and a receiving unit of a location privacy protection apparatus applied to a wireless terminal receives the identifier update key, and then uses the identifier update key to encrypt the second identifier and the first identifier validity period information or the second identifier update time information.

In addition, the location privacy protection apparatus provided by this embodiment of the present disclosure may be applied to, but is not limited to be applied to, an IEEE 802.11 MAC layer positioning process. In the IEEE 802.11 MAC layer positioning process, the identifier update notification message may be a location track notification frame, and the subsequent message may be a subsequent location track notification frame.

Further, an embodiment of the present disclosure further provides a location privacy protection system, including a wireless terminal and an access point, where the wireless terminal applies the foregoing location privacy protection method shown in FIG. 1, and the access point applies the foregoing location privacy protection method shown in FIG. 2 or FIG. 3.

Figure 11:
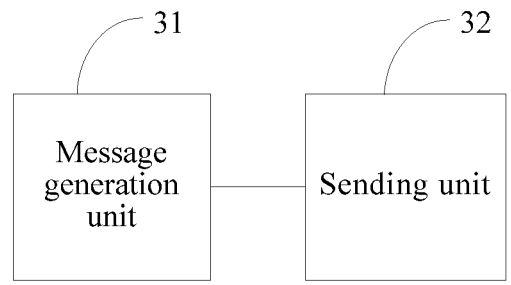
FIG. 11 is still another schematic structural diagram of a location privacy protection apparatus according to an embodiment of the present disclosure.

In addition, an embodiment of the present disclosure further provides another location privacy protection apparatus. Corresponding to the method embodiment shown in FIG. 4, the location privacy protection apparatus is applied to an access point. A schematic structural diagram of the location privacy protection apparatus is shown in FIG. 11, and the location privacy protection apparatus may include a message generation unit 31 and a sending unit 32.

The message generation unit 31 is configured to generate an identifier update notification message to be sent to a wireless terminal.

It is understandable that, the AP may be connected to multiple wireless terminals. Therefore, the identifier update notification message generated by the message generation unit 31 includes a first identifier of the wireless terminal, to indicate that which wireless terminal the identifier update notification message is to be sent to; and the identifier update notification message further includes second identifier information of the wireless terminal, where the information is used to notify the wireless terminal of an updated identifier.

The sending unit 32 is configured to send the identifier update notification message, so that the wireless terminal acquires a second identifier according to the second identifier information, and adds the second identifier to a message subsequently sent by the wireless terminal, to indicate that the subsequently sent message is sent by the wireless terminal.

In this embodiment of the present disclosure, a first identifier in an identifier update notification message that is generated by the message generation unit 31 for the first time may be a fixed MAC address of the wireless terminal or an AID that is initially allocated by the AP to the wireless terminal; a corresponding second identifier may be a temporary MAC address or an updated AID that is allocated to the wireless terminal. The temporary MAC address and the updated AID of the wireless terminal may be generated by the AP.

In a subsequently generated identifier update notification message, a first identifier is a second identifier in an identifier update notification message that is generated last time, and a second identifier in the subsequently generated identifier update notification message may be another temporary MAC address or another updated AID that is subsequently allocated by the AP to the wireless terminal.

Figure 12:
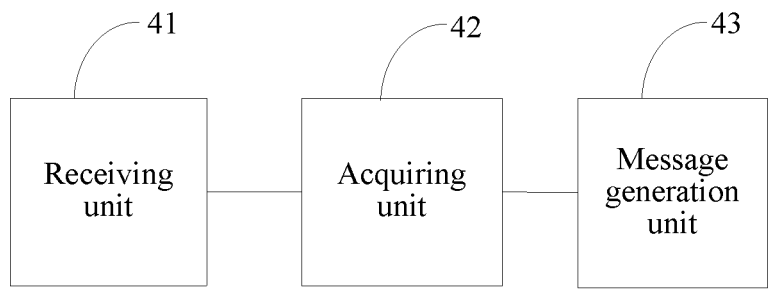
FIG. 12 is still another schematic structural diagram of a location privacy protection apparatus according to an embodiment of the present disclosure.

A time when the message generation unit 31 generates the identifier update notification message may be determined by a location privacy protection apparatus shown in FIG. 12. The location privacy protection apparatus further includes a detection unit configured to detect a moving track intersection event between the wireless terminal and another wireless terminal, and if it is detected that a moving track intersection event occurs between the wireless terminal and the another wireless terminal, trigger the sending unit 32, so as to implement aperiodically sending the identifier update notification message, thereby further implementing aperiodically updating the identifier.

Further, when generating the identifier update notification message to be sent to a wireless terminal, the message generation unit 31 is further configured to generate another identifier update notification message to be sent to another wireless terminal. Correspondingly, the sending unit 32 is further configured to send the another identifier update notification message to the another wireless terminal, so that a message subsequently sent by the another wireless terminal includes a respective second identifier, to indicate a sending terminal that sends the message.

It is understandable that, a meaning of updating addresses at the same time refers to completing an address update within a short time. One AP needs to send an address update notification frame to wireless terminals associated with the AP one by one, and the AP successively sends the address update notification frame to the wireless terminals from a micro perspective, but the AP can complete the address update of the wireless terminals in a time that is short enough. Therefore, from a macro perspective, the address update may be understood as being performed at the same time. The time that is short enough may be within several seconds. It is better that the time is within 1 second and even 10 milliseconds, with a preference to a shorter timescale.

Corresponding to the method embodiment shown in FIG. 5 and the apparatus embodiment shown in FIG. 11, an embodiment of the present disclosure further provides a location privacy protection apparatus applied to a wireless terminal. A schematic structural diagram of the location privacy protection apparatus is shown in FIG. 12, and the location privacy protection apparatus may include a receiving unit 41, an acquiring unit 42, and a message generation unit 43.

The receiving unit 41 is configured to receive an identifier update notification message sent by an access point, where the identifier update notification message includes a first identifier of the wireless terminal, to indicate that the identifier update notification message is sent to the wireless terminal; and the identifier update notification message further includes second identifier information of the wireless terminal.

In a case in which the access point detects that a moving track intersection event occurs between the wireless terminal and another wireless terminal, the receiving unit 41 receives the identifier update notification message sent by the access point.

The acquiring unit 42 is configured to acquire a second identifier from the second identifier information, and use the second identifier as an identifier of the wireless terminal. Reference may be made to the related description in the method embodiment shown in FIG. 4 for specific content of the first identifier and the second identifier, which is not described again in this embodiment of the present disclosure.

The message generation unit 43 is configured to add the second identifier to a message subsequently sent by the wireless terminal, to indicate that the subsequently sent message is sent by the wireless terminal.

The message subsequently sent by the wireless terminal includes a new identifier (that is, the second identifier) of the wireless terminal. Therefore, after receiving the message subsequently sent by the wireless terminal, the AP may determine, using the second identifier, that which wireless terminal sends the message.

Further, the identifier (that is, the second identifier) of the wireless terminal is updated after the identifier update notification message sent by the AP is received. Therefore, in the message subsequently sent by the wireless terminal, the identifier of the wireless terminal may be updated periodically or aperiodically, so that an value of an identifier field, in a message exchanged between the wireless terminal and the AP, for the wireless terminal is not fixed; in this way, exposing and tracing of a location of a wireless terminal that are caused due to a fixed value of an identifier field, in a message, for the wireless terminal can be avoided, effectively protecting location privacy of a user that uses the wireless terminal.

In the foregoing apparatus embodiments shown in FIG. 11 and FIG. 12, the identifier update notification message includes a set identifier update time, and after the set identifier update time arrives, the wireless terminal updates the identifier. The set identifier update time may include validity period information of the first identifier, that is, a currently used identifier, or second identifier update time information, that is, a time for updating the identifier of the wireless terminal to the second identifier. The second identifier in the identifier update notification message may be encrypted using a key, where the key is a key of a point-to-point session between the access point and the wireless terminal.

In addition, the location privacy protection apparatus provided by this embodiment of the present disclosure may be applied to an IEEE 802.11 MAC layer positioning process. In the process, the identifier update notification message may be a positioning configuration request frame.

An embodiment of the present disclosure further provides another location privacy protection system, including a wireless terminal and an access point, where the access point applies the location privacy protection method shown in FIG. 4, and the wireless terminal applies the location privacy protection method shown in FIG. 5.

Figure 13:
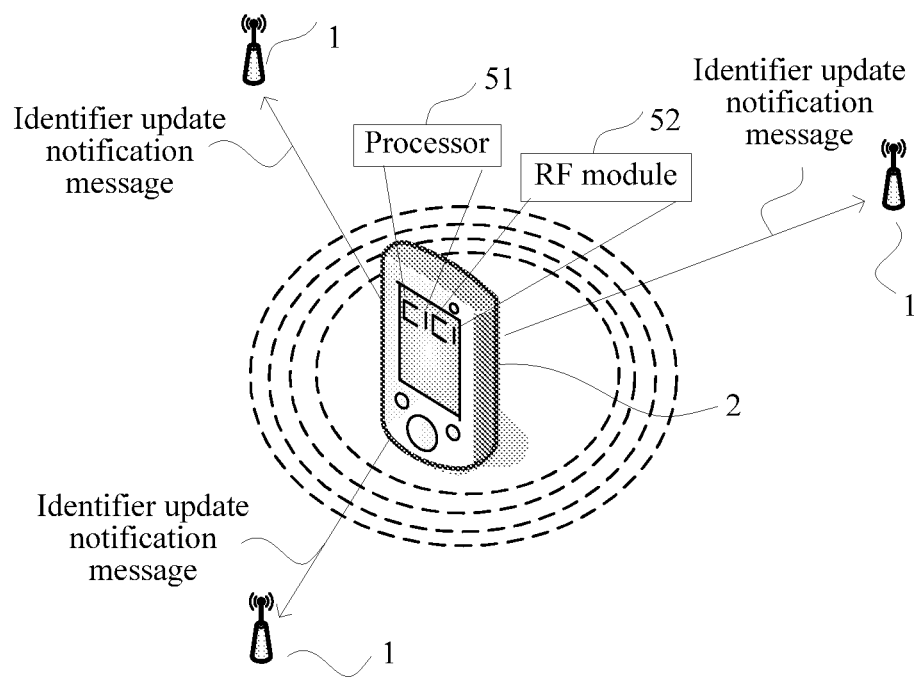
FIG. 13 is a schematic structural diagram of a wireless terminal according to an embodiment of the present disclosure.

An embodiment of the present disclosure further provides a wireless terminal, as shown in FIG. 13, including a processor 51 and a radio frequency (RF) module 52, where the processor 51 is configured to generate an identifier update notification message to be sent to at least one AP 1, and trigger the RF module 52 to send the identifier update notification message to the AP 1.

The identifier update notification message includes a first identifier of the wireless terminal 2, to indicate that the identifier update notification message is to be sent by the wireless terminal 2, and the identifier update notification message further includes second identifier information of the wireless terminal 2. After the RF module 52 sends the identifier update notification message to the AP 1, the AP 1 acquires a second identifier according to the second identifier information, and uses the second identifier as an identifier of the wireless terminal 2.

After the processor 51 triggers the RF module 52 to send the identifier update notification message, a subsequent message generated by the processor 51 includes the second identifier, to indicate that the subsequent message is sent by the wireless terminal 2. The processor 51 triggers the RF module 52 to send the subsequent message to the AP 1.

Figure 14:
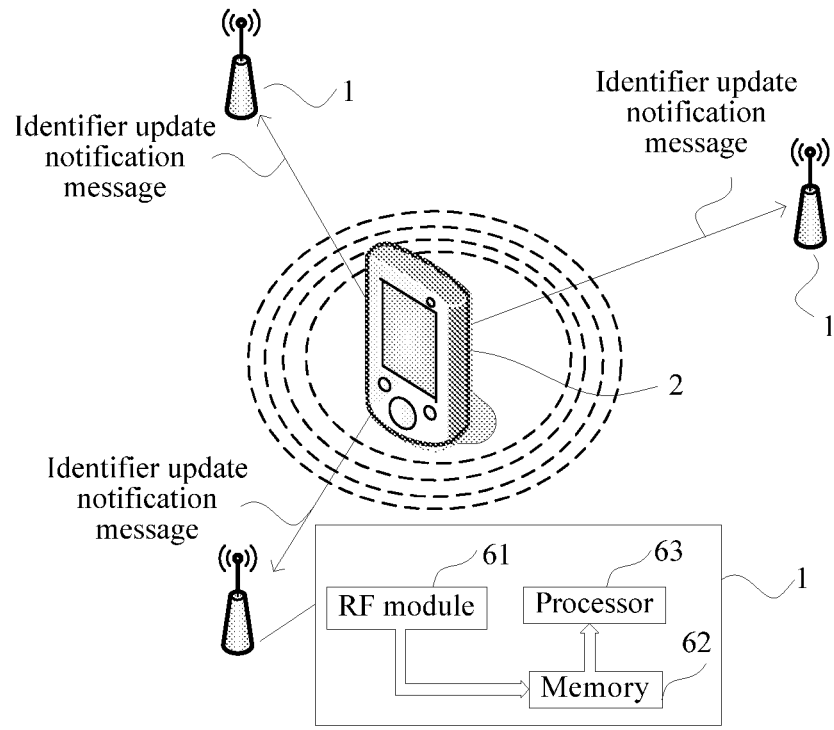
FIG. 14 is a schematic structural diagram of an AP according to an embodiment of the present disclosure.

Correspondingly, an embodiment of the present disclosure further provides an AP, as shown in FIG. 14. In the figure, 1 represents the AP, which includes an RF module 61, a memory 62, and a processor 63. The RF module 61 is configured to receive an identifier update notification message sent by a wireless terminal 2, where the identifier update notification message includes a first identifier of the wireless terminal 2, to indicate that the identifier update notification message is sent by the wireless terminal 2, and the identifier update notification message further includes second identifier information of the wireless terminal 2. The first identifier of the wireless terminal 2 and the second identifier information of the wireless terminal 2 are stored in the memory 62.

The processor 63 may acquire a second identifier from the second identifier information, use the second identifier as an identifier of the wireless terminal 2, and determine, after the RF module 61 receives a subsequent message, whether a value of an identifier field, in the subsequent message, for a sending device is the second identifier, so as to determine whether the subsequent message is sent by the wireless terminal 2.

If the processor 63 determines that the value of the identifier field, in the subsequent message, for the sending device is the second identifier, the processor 63 may determine that the subsequent message is sent by the wireless terminal 2.

Figure 15:
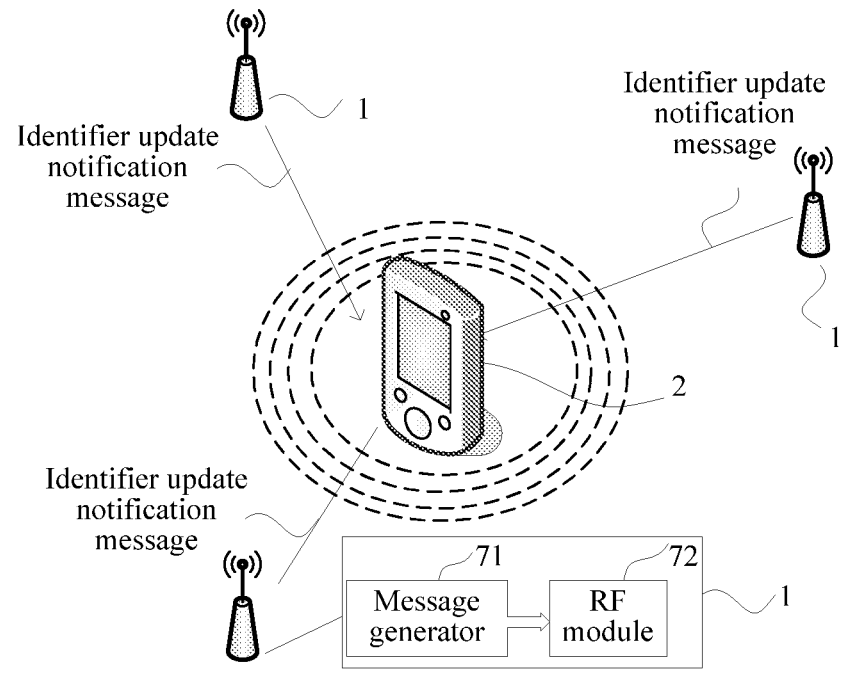
FIG. 15 is another schematic structural diagram of a wireless terminal according to an embodiment of the present disclosure.

In addition, an embodiment of the present disclosure further provides another AP. A schematic structural diagram of the AP is shown in FIG. 15. In the figure, 1 represents the AP, which may include a message generator 71 and an RF module 72. The message generator 71 generates an identifier update notification message to be sent to a wireless terminal 2, and triggers the RF module 72 to send the identifier update notification message.

The identifier update notification message includes a first identifier of the wireless terminal 2, to indicate that the identifier update notification message is to be sent to the wireless terminal 2, and the identifier update notification message further includes second identifier information of the wireless terminal 2. After receiving the identifier update notification message, the wireless terminal 2 may acquire a second identifier according to the second identifier information, and add the second identifier to a message subsequently sent by the wireless terminal 2, to indicate that the subsequently sent message is sent by the wireless terminal 2.

Figure 16:
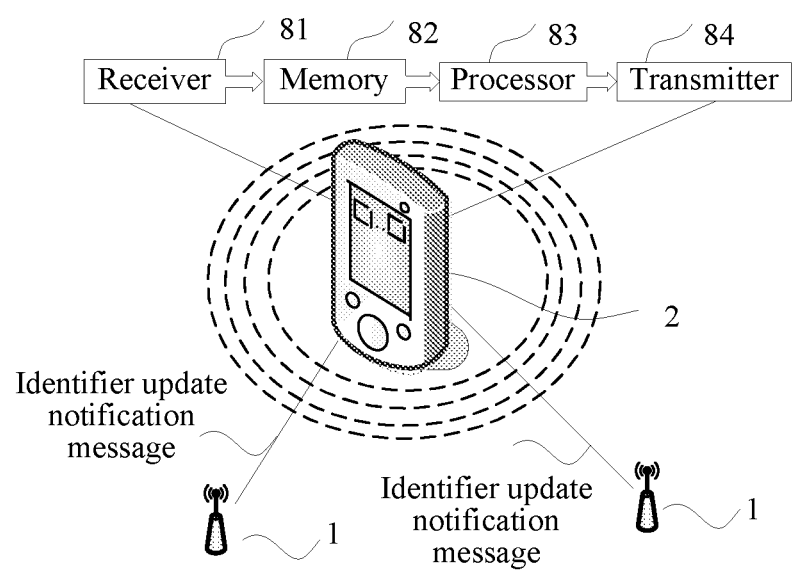
FIG. 16 is another schematic structural diagram of an AP according to an embodiment of the present disclosure.

Correspondingly, an embodiment of the present disclosure further provides a wireless terminal. A schematic structural diagram of the wireless terminal is shown in FIG. 16, and the wireless terminal may include a receiver 81, a memory 82, a processor 83, and a transmitter 84. The receiver 81 is configured to receive an identifier update notification message sent by an AP 1, where the identifier update notification message includes a first identifier of the wireless terminal 2, to indicate that the identifier update notification message is sent to the wireless terminal 2, and the identifier update notification message further includes second identifier information of the wireless terminal 2.

The processor 83 is configured to acquire a second identifier from the second identifier information stored by the memory 82, and use the second identifier as an identifier of the wireless terminal 2; and is configured to add the second identifier to a message subsequently generated by the wireless terminal 2, to indicate that the subsequently generated message is sent by the wireless terminal 2, and trigger the transmitter 84 to send the subsequently generated message.

It should be noted that the embodiments in this specification are all described in a progressive manner, each embodiment focuses on a difference from other embodiments, and for same or similar parts in the embodiments, refer to these embodiments. An apparatus embodiment is basically similar to a method embodiment, and therefore is described briefly; for related parts, refer to partial descriptions in the method embodiment.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

For ease of description, the foregoing apparatus is described by dividing functions into various units. Certainly, during implementation of the present disclosure, the functions of each unit may be implemented in a same piece of or a plurality of pieces of software and/or hardware.

Based on the foregoing descriptions of the implementation manners, a person skilled in the art may clearly understand that the present disclosure may be implemented by software in addition to a necessary general hardware platform. Based on such an understanding, the technical solutions of the present disclosure essentially or the part contributing to the prior art may be implemented in a form of a software product. The software product may be stored in a storage medium, such as a read-only memory (ROM)/random-access memory (RAM), a magnetic disk, or an optical disc, and includes several instructions for instructing a computer device (which may be a personal computer, a server, or a network device) to perform the methods described in the embodiments or some parts of the embodiments of the present disclosure.

The foregoing describes in detail the location privacy protection method, apparatus, and system provided in the present disclosure. In this specification, specific examples are used to describe the principle and implementation manners of the present disclosure, and the description of the embodiments is only intended to help understand the method and core idea of the present disclosure. In addition, a person of ordinary skill in the art may, based on the idea of the present disclosure, make modifications with respect to the specific implementation manners and the application scope. Therefore, the content of this specification shall not be construed as a limitation to the present disclosure.

What is claimed is:

1. A media access control (MAC) layer positioning method to protect location privacy of a first wireless terminal, the method comprising:

generating, by the first wireless terminal, a positioning configuration response frame to be sent to at least one access point, the positioning configuration response frame comprising a first MAC address of the first wireless terminal and second identifier information of the first wireless terminal that includes a second MAC address for the first wireless terminal;

sending, by the first wireless terminal, the positioning configuration response frame to the at least one access point;

sending, by the first wireless terminal to the at least one access point during a period of time for which the second MAC address is valid, one or more first location track notification frames that include the second MAC address in an address field of the one or more first location track notification frames to indicate that the one or more first location track notification frames are from the first wireless terminal, the one or more first location track notification frames further including a third MAC address for the first wireless terminal and identifier update time information indicating the period of time for which the second MAC address is valid; and sending, by the first wireless terminal to the at least one access point when the period of time for which the second MAC address is valid has expired, a second location track notification frame that includes the third MAC address in the address field of the second location track notification frame to indicate that the second location track notification frame is from the first wireless terminal.

2. The method according to claim 1, wherein the first wireless terminal sends the positioning configuration response frame to the at least one access point after receiving a positioning configuration request frame from the at least one access point.

3. The method according to claim 1, further comprising, encrypting, by the first wireless terminal, the identifier update time information to generate encrypted identifier update time information, the one or more first location track notification frames sent by the first wireless terminal to the at least one access point including the encrypted identifier update time information.

4. The method according to claim 3, further comprising:

receiving, by the first wireless terminal, an identifier update key from the at least one access point; and encrypting, by the first wireless terminal, the second MAC address using the identifier update key.

5. The method according to claim 1, wherein the method further comprises determining, by the first wireless terminal, that the period of time for which the second MAC address is valid has expired.

6. A media access control (MAC) layer positioning method to protect location privacy of a first wireless terminal, the method comprising:
receiving, by an access point, a positioning configuration response frame from the first wireless terminal, the positioning configuration response frame comprising a first MAC address of the first wireless terminal and a second MAC address for the first wireless terminal, the positioning configuration response frame including the first MAC address in an address field of the positioning configuration response frame to indicate that the positioning configuration response frame is from the first wireless terminal;
acquiring, by the access point, the second MAC address from the positioning configuration response frame;
receiving, by the access point from the first wireless terminal, a first location track notification frame including the second MAC address in an address field of the first location track notification frame to indicate that the first location track notification frame is from the first wireless terminal, the first location track notification frame further including a third MAC address for the first wireless terminal;
detecting a moving track intersection event between the first wireless terminal and a second wireless terminal;
sending, by the access point in response to detecting the moving track intersection event, an address update notification frame to the first wireless terminal, the address update notification frame instructing the first wireless terminal to update a MAC address used by the first wireless terminal to identify the first wireless terminal from the second MAC address to the third MAC address;
receiving, by the access point from the first wireless terminal, a second location track notification frame that includes the third MAC address in an address field of the second location track notification frame to indicate that the second location track notification frame is from the first wireless terminal; and
determining, by the access point, that the second location track notification frame is from the first wireless terminal based on the third MAC address in the second location track notification frame.

7. The method according to claim 6, wherein before receiving the positioning configuration response frame from the first wireless terminal, the method further comprises sending, by the access point, a positioning configuration request frame to the first wireless terminal to request the first wireless terminal to send the positioning configuration response frame.

8. A media access control (MAC) layer positioning method to protect a location privacy of a first wireless terminal, the method comprising:
detecting a moving track intersection event between the first wireless terminal and a second wireless terminal;
generating, by an access point, an address update notification frame to be sent to the first wireless terminal, the address update notification frame comprising a first MAC address of the first wireless terminal and a second MAC address for the first wireless terminal, the first MAC address included in an address field of the address update notification frame to indicate that the address update notification frame is to be sent to the first wireless terminal;
sending, by the access point in response to detecting the moving track intersection event, the address update notification frame to the first wireless terminal, the address update notification frame instructing the first wireless terminal to update a MAC address used by the first wireless terminal to identify the first wireless terminal from the first MAC address to the second MAC address;
receiving, by the access point from the first wireless terminal, a location track notification frame that includes the second MAC address in an address field of the location track notification frame to indicate that the location track notification frame is from the first wireless terminal; and
determining, by the access point, that the location track notification frame is from the first wireless terminal based on the second MAC address in the address field of the location track notification frame.

9. The method according to claim 8, wherein at the same time of the sending the address update notification frame to the first wireless terminal, the method further comprises:
generating, by the access point, another address update notification frame to be sent to the second wireless terminal; and
sending, by the access point, the another address update notification frame to the second wireless terminal.

10. The method according to claim 9, wherein the another address update notification frame is sent in response to detecting the moving track intersection event.

11. The method according to claim 8, wherein the address update notification frame further comprises:
second identifier update time information indicating a time at which the first wireless terminal should begin using the second MAC address; or
first MAC address validity period information that indicates how long the first wireless terminal should use the first MAC address.

12. The method according to claim 8, wherein the second MAC address is encrypted using a key of a point-to-point session between the access point and the first wireless terminal.

13. The method according to claim 8, wherein the first MAC address is a fixed MAC address of the first wireless terminal and the second MAC address is a temporary MAC address of the first wireless terminal.

14. A media access control (MAC) layer positioning method to protect a location privacy of a first wireless terminal, the method comprising:
receiving, by the first wireless terminal from an access point, a positioning configuration request frame comprising a first MAC address of the first wireless terminal and a second MAC address for the first wireless terminal, wherein the positioning configuration request frame includes the first MAC address in an address field to indicate that the positioning configuration request frame is for the first wireless terminal;
acquiring, by the first wireless terminal, the second MAC address;
sending, by the first wireless terminal to the access point during a remaining use time of the second MAC address, one or more first location track notification frames that include the second MAC address in an address field of the one or more first location track notification frames to indicate that the one or more first location track notification frames are from the first wireless terminal, the one or more first location track notification frames further including identifier update time information indicating the remaining use time of the second MAC address; and sending, by the first wireless terminal to the access point when the remaining use time of the second MAC address has expired, a second location track notification frame that includes a third MAC address in an address field of the second location track notification frame to indicate that the second location track notification frame is from the first wireless terminal.

15. The method according to claim 14, wherein the first MAC address is a fixed MAC address of the first wireless terminal and the second MAC address is a temporary MAC address for the first wireless terminal.

16. The method according to claim 14, wherein the one or more first location track notification frames include multiple first location track notification frames.

17. A location privacy protection apparatus of a wireless terminal, the location privacy protection apparatus comprising:

a processor configured to generate a positioning configuration response frame to be sent to at least one access point, the positioning configuration response frame comprising a first media access control (MAC) address of the wireless terminal and second identifier information of the wireless terminal that includes a second MAC address for the wireless terminal; and a transmitter coupled to the processor and configured to:
  send the positioning configuration response frame to the at least one access point;
  send, to the at least one access point during a period of time for which the second MAC address is valid, one or more first location track notification frames that include the second MAC address in an address field of the one or more first location track notification frames to indicate that the one or more first location track notification frames are from the wireless terminal, the one or more first location track notification frames further including a third MAC address for the wireless terminal and identifier update time information indicating the period of time for which the second MAC address is valid; and
  send, to the at least one access point when the period of time for which the second MAC address is valid has expired, a second location track notification frame that includes the third MAC address in the address field of the second location track notification frame to indicate that the second location track notification frame is from the wireless terminal.

18. The apparatus according to claim 17, wherein the apparatus further comprises a receiver coupled to the processor, and the transmitter is further configured to send the positioning configuration response frame to the at least one access point after the receiver receives a positioning configuration request frame from the at least one access point.

19. The apparatus according to claim 17, wherein the processor is further configured to encrypt the identifier update time information to generate encrypted identifier update time information, and the one or more first location track notification frames include the encrypted identifier update time information.

20. The apparatus according to claim 19, wherein the apparatus further comprises a receiver coupled to the processor and configured to receive an identifier update key from the at least one access point, and the processor is further configured to encrypt the second MAC address using the identifier update key.

* * * * *